(12) United States Patent
Kannar et al.

(10) Patent No.: US 12,521,342 B2
(45) Date of Patent: Jan. 13, 2026

(54) FAST DISINTEGRATING TABLET

(71) Applicant: CUBOPHARM PTY LTD, Karingal (AU)

(72) Inventors: David Kannar, Melbourne (AU); Gregory Yu Foo Szto, Melbourne (AU); Tomer Madmon, Melbourne (AU)

(73) Assignee: CUBOPHARM PTY LTD, Karingal (AU)

( * ) Notice: Subject to any disclaimer, the term of this patent is extended or adjusted under 35 U.S.C. 154(b) by 0 days.

(21) Appl. No.: 18/760,150

(22) Filed: Jul. 1, 2024

(65) Prior Publication Data

US 2024/0350405 A1 Oct. 24, 2024

Related U.S. Application Data

(63) Continuation of application No. 16/606,139, filed as application No. PCT/AU2018/050366 on Apr. 20, 2018, now abandoned.

(30) Foreign Application Priority Data

| Apr. 20, 2017 | (AU) | 2017901445 |
| Dec. 20, 2017 | (AU) | 2017905101 |
| Mar. 9, 2018 | (AU) | 2018900784 |

(51) Int. Cl.
 *A61K 9/00* (2006.01)
 *A61K 9/20* (2006.01)

(52) U.S. Cl.
 CPC ............ *A61K 9/0056* (2013.01); *A61K 9/006* (2013.01); *A61K 9/2013* (2013.01); *A61K 9/2027* (2013.01); *A61K 9/2059* (2013.01)

(58) Field of Classification Search
 None
 See application file for complete search history.

(56) References Cited

U.S. PATENT DOCUMENTS

| 4,681,893 A | 7/1987 | Roth |
| 2005/0196438 A1 | 9/2005 | Wang et al. |
| 2008/0031947 A1 | 2/2008 | Hamed et al. |
| 2010/0010101 A1 | 1/2010 | Cherukuri |
| 2010/0113453 A1 * | 5/2010 | McDevitt ............... A61P 25/00 514/250 |
| 2013/0034538 A1 | 2/2013 | Garti et al. |
| 2016/0081996 A1 * | 3/2016 | Mulet .................... A61K 45/06 514/356 |

FOREIGN PATENT DOCUMENTS

| EP | 2826465 A1 | 1/2015 |
| WO | WO-97/13528 A1 | 4/1997 |
| WO | WO-2005/117830 A1 | 12/2005 |
| WO | WO-2006/013369 A2 | 2/2006 |
| WO | WO-2006/037348 A1 | 4/2006 |
| WO | WO-2007/020079 A2 | 2/2007 |
| WO | WO-2007/031801 A1 | 3/2007 |
| WO | WO-2008/002529 A2 | 1/2008 |
| WO | WO-2009/086046 A1 | 7/2009 |
| WO | WO-2013/088161 A1 | 6/2013 |
| WO | WO-2013/183062 A2 | 12/2013 |
| WO | WO-2014179845 A1 * | 11/2014 | ........... A61K 31/201 |
| WO | WO-2015/132660 A1 | 9/2015 |
| WO | WO-2015/176008 A1 | 11/2015 |
| WO | WO-2015/189726 A1 | 12/2015 |
| WO | WO-2016/053092 A1 | 4/2016 |
| WO | WO-2016/069871 A1 | 5/2016 |
| WO | WO-2017/017679 A1 | 2/2017 |
| WO | WO-2018/191792 A1 | 10/2018 |
| WO | WO-2018/191793 A1 | 10/2018 |
| WO | WO-2018/191794 A1 | 10/2018 |
| WO | WO-2020/082137 A1 | 4/2020 |

OTHER PUBLICATIONS

Clogston et al., "Phase behavior of a monoacylglycerol: (Myverol 18-99K)/water system," Chem Phys Lipids. 107(2):191-220 (2000).
Davies, "A quantitative kinetic theory of emulsion type. I. Physical chemistry of the emulsifying agent," *Gas/Liquid and Liquid/Liquid Interfaces: Proceedings of the International Congress of Surface Activity.* 426-38 (1957).
Degreef et al., "The tolerability and efficacy of low-dose simvastatin in statin-intolerant patients," Eur J Intern Med. 21(4):293-6 (Aug. 2010).
Du et al., "A novel approach to enhance the mucoadhesion of lipid drug nanocarriers for improved drug delivery to the buccal mucosa," Int J Pharm. 471(1-2):358-65 (2014).
Estracanholli et al., "Liquid crystalline systems for transdermal delivery of celecoxib: in vitro drug release and skin permeation studies," AAPS PharmSciTech. 15(6):1468-75 (2014).
Gabr et al., "Hexagonal liquid crystalline nanodispersions proven superiority for enhanced oral delivery of rosuvastatin: in vitro characterization and in vivo pharmacokinetic study," J Pharm Sci. 106(10):3103-12 (2017).
Guo et al., "Lyotropic liquid crystal systems in drug delivery," Drug Discov Today. 15(23-24):1032-40 (2010).
Lai et al., "Glyceryl monooleate/poloxamer 407 cubic nanoparticles as oral drug delivery systems: I. In vitro evaluation and enhanced oral bioavailability of the poorly water-soluble drug simvastatin," AAPS PharmSciTech. 10(3):960-6 (2009).
Lipitor (atorvastatin calcium). New York, NY: Pfizer Inc, 2009 (23 pages).

(Continued)

*Primary Examiner* — Susan T Tran
(74) *Attorney, Agent, or Firm* — The Roy Gross Law Firm, LLC; Roy D. Gross

(57) ABSTRACT

An oral disintegrating tablet that forms liquid crystalline particles or liquid crystalline bulk phase upon disintegration. The oral disintegrating tablet is fast disintegrating following contact with saliva and/or the oral mucosa but also provides slowed delivery of the active ingredient to avoid the difficulties associated with the speed of delivery of an active ingredient through the oral mucosa.

21 Claims, 7 Drawing Sheets

(56) References Cited

OTHER PUBLICATIONS

Milak et al., "Glycerol monooleate liquid crystalline phases used in drug delivery systems," Int J Pharm. 478(2):569-87 (2015).
Moebus et al., "Cubic phase-forming dry powders for controlled drug delivery on mucosal surfaces," J Control Release. 157(2): 206-15 (2012).
Pan et al., "Nanostructed cubosomes as advanced drug delivery system," Curr Pharm Des. 19(35):6290-7 (2013).
Puratchikody et al., "Buccal drug delivery: past, present and future—a review," Int J Drug Deliv. 3(2):171-84 (2011).
Shah et al., "Spray dried glyceryl monooleate-magnesium trisilicate dry powder as cubic phase precursor," Int J Pharm. 323(1-2):18-26 (2006).
Sharma SK. Low Molecular Weight Heparins. Med J Armed Forces India. Jul. 1998;54(3):285-286. doi: 10.1016/S0377-1237(17)30571-3. Epub Jun. 26, 2017. PMID: 28775503; PMCID: PMC5531654.
Souza et al., "Mucoadhesive system formed by liquid crystals for buccal administration of poly(hexamethylene biguanide) hydrochloride," J Pharm Sci. 103(12):3914-23 (2014).
International Search Report for International Patent Application No. PCT/AU2018/050366, dated Jun. 29, 2018 (9 pages).

\* cited by examiner

FAST DISINTEGRATING TABLET

FIELD OF THE INVENTION

The present invention relates to disintegrating tablets, methods for the manufacture of disintegrating tablets and methods of medical treatment using disintegrating tablets. In particular, the present invention relates to tablets formulated to deliver an active ingredient via the oral mucosa following disintegration.

BACKGROUND OF THE INVENTION

An orally disintegrating tablet or orally dissolving tablet (ODT) is a drug dosage form that is a solid oral preparation that disintegrates rapidly in the oral cavity. ODTs differ from traditional tablets in that they are designed to be dissolved in the oral cavity rather than be swallowed whole. For example, an ODT may dissolve on the tongue, sublingually (under the tongue) or buccally (ie on the cheek).

ODTs have been used for patients who experience dysphagia (difficulty in swallowing) and when it is convenient to have a tablet that can be taken without water. Often, these are dosage forms specially designed for children or the elderly.

Drugs delivered via the oral mucosa by ODTs can have a faster onset of effects than drugs delivered by tablets or capsules. Glyceryl trinitrate (GTN) is a known drug that has been formulated as an ODT for rapid drug absorption because rapid absorption is critical to prevent a heart attack. Unfortunately, for other active ingredients rapid onset is unsuitable because the blood concentration of the drug would rise too fast or too far causing side effects and/or resulting in a short therapeutic effect.

ODTs are of interest for drugs that yield low bioavailability through the digestive tract but are inconvenient to administer parenterally, such as steroids and narcotic analgesics. In addition to rapid action, ODT dosage forms may offer significant advantage by avoiding extensive first pass metabolism. This could mean less drug is required to produce an equivalent effect compared to oral administration. Associated side effects may also be reduced. However, ODTs are not currently used where slow release of a drug is required. If speed of ODT absorption could be slowed or managed, then this delivery route could be useful for a wider range of active ingredients. It would be particularly useful if the absorption of the active ingredient could be slowed down but the ODT designed so that it did not sit in the mouth for an extended period.

ODT dosage forms also currently have limited utility for lipophilic drugs, which have difficulty absorbing across the membrane. It would be useful to have an ODT that assists with delivery of lipophilic drugs via oral mucosa.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

The inventors of the present invention have developed an ODT that contains an amphiphile, which forms liquid crystalline particles when the ODT contacts a hydrophilic fluid. The ODT developed also disintegrates rapidly without interfering with the formation of the liquid crystalline particles.

For at least some active ingredients, the ODT also slows release of an active ingredient to avoid the difficulties associated with the speed of delivery of an active ingredient through the oral mucosa. Consequently, in some embodiments, the ODT of the present invention is fast disintegrating while at the same time providing slowed delivery of the active ingredient. This allows the use of ODT formulations for drugs previously not suitable for that dosage form, while still providing patients with the convenience of a fast disintegrating ODT.

A composition comprising an amphiphilic compound capable of self-assembling into liquid crystalline particles that prolongs release of an active ingredient has been described in international patent publication no. WO 2014/179845. However, that composition was not rapidly disintegrating and did not relate to delivery of a lipophilic drug via ODT. In a traditional oral tablet or a traditional oral disintegrating tablet rapid disintegrating formulations are known. Prolonged release oral disintegrating tablet technology has not been used in any commercially available pharmaceutical product. In particular, the rapid disintegrating prolonged release oral disintegrating tablets have not been previously developed. It was surprising to the inventors of the present invention that they could achieve tablet disintegration in less than two minutes without damaging the formation of the self-assembled structures. Without being bound by theory, it is believed the self-assembled structures result in the prolonged release of the active ingredient and allow for delivery of some ingredients that cannot be delivered at all or as well by a traditional ODT.

The present invention provides an oral disintegrating tablet (ODT) for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes. The amphiphile optionally also prolong the release of the active ingredient. It is preferred that the ODT disintegrates in 1 to 110, 1 to 100, 1 to 90, 1 to 80, 1 to 70, 1 to 60, 1 to 50, 1 to 40, 1 to 30, 10 to 30, 20 to 60, 30 to 90, 1 to 20 or 1 to 10 seconds. In some embodiments, the active ingredient is orally bioavailable. However, oral bioavailability for this dosage form can be different to oral bioavailability for other oral dosage forms. The presence of the self-assembled structures may allow for the oral delivery of active ingredients that are not orally bioavailable in other environments.

In some embodiments, when the ODT is administered to the oral mucosa, the ODT facilitates systemic administration of the active ingredient across the oral mucosa.

In all embodiments of the composition of the invention, the amphiphilic compound is capable of self-assembling in to liquid crystalline particles upon contact with a hydrophilic solvent. Therefore, capable of self-assembly into liquid crystalline particles refers to capable of assembling into liquid crystalline particles in hydrophilic solvent of physiological pH, physiological temperature and physiological salinity etc. It is preferred that, as the tablet disintegrates in a hydrophilic solvent the amphiphilic compound self-assembles into liquid crystalline particles. It is preferred that the active ingredient is encapsulated into the liquid crystalline particles. The analytical techniques presently available make it difficult to confirm whether or not the active ingredient is encapsulated within the liquid crystalline particles. It is preferred that the tablet is muccoadhesive, that the liquid crystalline particles are muccoadhesive or both. If the tablet is muccoadhesive, it can adhere to human mucosa, which can be observed when the tablet is administered.

The tablet is for administration to the oral mucosa. One suitable form of administration is sublingual administration (under the tongue). Another suitable form of administration is buccal administration (ie to the buccal vestibule, that is, the area inside the mouth between the lining of the cheek and the teeth/gums). A further form of administration is where the composition is administered under the lip. When administered to the oral mucosa in this way, the active ingredient diffuses into the blood through the mucosa in the mouth.

Optionally, the self-assembled structure is a cubic phase or hexagonal phase as discussed below. Optionally the self-assembled structure is lamellar phase. Optionally, the self-assembled structure is lamellar phase, a cubic phase or hexagonal phase.

In some embodiments, the ODTs of the present invention are prolonged release ODTs. The prolonged release is determined by reference to either an immediate release ODT or an immediate release tablet.

For many active ingredients, maximum blood concentration is achieved within 30 minutes of administration of a traditional ODT. See for example the rapid absorption of glyceryl trinitrate or the t(max) for sublingual epinephrine reported in Gu (2002) to be similar to the t(max) for intramuscular injection because the sublingual area provides large mucosal contact surface with high vascularisation that facilitates rapid drug absorption.

For ODTs of the invention, the maximum blood concentration of the active ingredient is optionally achieved over 30 minutes following administration of the ODT, over 45 minutes following administration of the ODT, over 1 hour following administration of the ODT, over 2 hours following administration of the ODT, over 3 hours following administration of the ODT, over 4 hours following administration of the ODT or over 5 hours following administration of the ODT. It will be understood that the time taken to maximum blood concentration may vary depending on the active ingredient used.

In some embodiments, the blood concentration following administration of the ODT is within 30% of the maximum blood concentration for 30 minutes, 1 hour, 90 minutes or 2 hours or more.

Preferred ODTs are stable for at least 2 years, at least 1 year, at least 9 months, at least 6 months or at least 3 months. In some embodiments ODTs are stable at 25° C./60% relative humidity for at least 2 years, at least 1 year, at least 9 months, at least 6 months or at least 3 months and/or stable at 5° C. for at least 2 years, at least 1 year, at least 9 months, at least 6 months or at least 3 months, in particular, preferred ODTs retain about 90% or about 95% or more active ingredient following storage at either 25° C./60% relative humidity or 5° C. for at least 2 years, at least 1 year, at least 9 months or at least 6 months. Optionally, the active ingredient is a statin and there is also no change in lactone or 5-oxo-rosuvastatin calcium levels following storage at 5° C. for at least 3, 6 or 9 months and/or less than 0.5% w/w lactone and less than 0.4% w/w 5-oxo-rosuvastatin calcium following storage at 25° C./60% relative humidity for at least 3 or 6 months.

The amphiphilic compound is optionally present at an amount of about 1 to 20% w/w of the ODT. In some embodiments the amount of amphiphilic compound is 3 to 10% w/w, 4 to 8% w/w, 4.5 to 7.5% w/w or 5 to 7% w/w. In preferred embodiments the amount of amphiphilic compound is about 5% w/w or about 7% w/w. Use of about 5% w/w of amphiphilic compound is preferred for formulations with an about 1:1 w/w ratio of amphiphilic compound to active ingredient. Use of about 7% w/w of amphiphilic compound is preferred for formulations with an about 4:1 w/w ratio of amphiphilic compound to active ingredient.

The amphiphilic compound is a compound that possesses both a hydrophilic portion and a hydrophobic portion and is capable of self-assembling into liquid crystalline particles. The amphiphilic compound can also be a mixture of amphiphiles. Amphiphiles capable of self-assembly behaviour have been described in various publications, such as, for example, Drummond (1999). Examples of amphiphiles that are capable of self-assembly include, but are not limited to: surfactants, lipids, and block copolymers. More specifically, the amphiphilic compound is optionally selected from: fatty acids, fatty alcohols, acylglycerols, glycolipids, sphingolipids, phospholipids, cholesterol and mixtures thereof.

Optionally, the amphiphilic compound is non-ionic.

Hydrophilic-lipophilic balance (HLB) is a measure of the hydrophilicity/lipophilicity of an amphiphile. A HLB under 10 indicates lipid solubility and a HLB over 10 indicates water solubility. Optionally, the compound has a HLB of less than about 10, less than 8 or less than 6. Optionally, the HLB is greater than about 1. Optionally, the HLB is 0 to <10, or 1 to <10, 0 to <8, 1 to <8, 0 to <6 or 1 to <6.

The critical packing parameter (CPP) measures the relative volume of the head (hydrophilic portion) and tail (lipophilic portion) of a surfactant. The CPP indicates the type of liquid crystal likely to form when an amphiphilic compound is in solution at a level above its critical micelle concentration. A CPP of 1 means the surfactant is symmetrical. The CPP is the tail volume (V) divided by the sum of the effective head area (a) and the tail length (l) (ie CPP=V/(a·l)). An amphiphile with a CPP <⅓ is likely to form spherical micelles. An amphiphile with a CPP >⅓ but <½ is likely to form cylindrical micelles. An amphiphile with a CPP >½ but <1 is likely to form lamella micelles. An amphiphile with a CPP >1 is likely to form inversed spherical micelles. The amphiphilic compound of the invention optionally has a CPP >⅓, >½, or >1 at body temperature, atmospheric pressure and in water, pbs or saliva.

Optionally, the amphiphilic compound is a non-ionic amphiphile comprising a HLB of 0 to >10 and a CPP of >½. Optionally, the amphiphilic compound is a non-ionic amphiphile comprising a HLB of 1 to >8 and a CPP of >1.

In some embodiments the amphiphilic compound comprises Formula (I):

$$H\text{-}T \qquad (I)$$

wherein

H is selected from the group consisting of an ester, ether, anhydride, amide, amine, carbamide, glycerol, biuret, phenyl, pyridine or phosphate having at least 2 hydrogen bond forming functional groups; and T is selected form the group consisting of:
(i) a single $C_{12}$ to $C_{18}$ alkyl, alkenyl and alkynyl terminally attached to H optionally comprising:
 a. one or more double bonds (preferably cis and at about C7 to C11); or
 b. three or more methyl branches (preferably isoprenoid branching); and
(ii) two $C_{12}$ to $C_{18}$ alkyl, alkenyl and alkynyl both terminally attached to H.

The ester and amide groups etc of H can be present in either orientation ie the ester could be —OC(O)-T or —C(O)O-T.

Optionally, the ester, ether, anhydride, amide, amine, carbamide, glycerol, biuret, phenyl, pyridine or phosphate forms part of, or is substituted with, a sugar (eg glucoside), xyloside (monomer or dimer) or $C_1$ to $C_4$ alkyl, alkenyl or alkynyl optionally with two to six hydroxyl, amine or methanol groups and attached at either a terminal or non-terminal carbon.

Optionally, H is selected from the group consisting of ester, ether, amine, amide or glycerol.

Optionally, H has 3 to 6 hydrogen bond forming groups.

Optionally, T has a molecular weight of at least >200 amu.

The amphiphilic compound is optionally selected from the group consisting of glycerol monooleate, glyceryl monolinoleate, glyceryl monooleyl ether, oleyl glycerate, monovaccenin, oleyl urea, linoleyl urea, phytanyl urea, hexahydrofarnesyl-urea, monooleain, phytantriol, glucose stearate, fructose stearate and combinations thereof. In one embodiment, the amphiphilic compound is selected from a fatty acid comprising a 6 to 24 carbon chain, preferably a 12 to 24 carbon chain, more preferably a 16 to 20 carbon chain, most preferably an 18 carbon chain. The amphiphilic compound can also be a mixture of fatty acids. In a preferred embodiment, the amphiphilic compound is selected from one or more mono- and/or di-glycerides of fatty acids comprising a 6 to 24 carbon chain, preferably a 12 to 24 carbon chain, more preferably a 16 to 20 carbon chain, most preferably an 18 carbon chain. The carbon chain may optionally have one or more double bonds such that it is unsaturated. One preferred class of amphiphilic compounds is glycerol monooleates (GMOs). The Handbook of Pharmaceutical Excipients lists GMO as having a HLB of 3.3. In a particularly preferred embodiment the amphiphilic compound is Myverol™ 18-99k (trade mark owned by Kerry Group Services Limited). Myverol™ is generally considered a GMO despite including some non-GMO amphiphiles. Myverol™ 18-99k is produced from the reaction of glycerol with canola (low erucic acid rapeseed) oil and contains a mixture of monoacylglycerols, diacylglycerols and glycerol. The compositional analysis of Myverol™ 18-99k is detailed in Clogston (Clogston 2000) wherein Myverol™ 18-99k was found to contain 82% monoacylglycerols (consisting of 86.6% monoolein (1-Oleoyl-rac-glycerol), 7.0% monostearin (1-Stearoyl-rac-glycerol), 3.5% monopalmitin (1-monohexadecanoyl-rac-glycerol), 0.9% monoarachidin (1-Arachidonoyl-glycerol) and 2.0% unidentified monoacylglycerols), 13.4% diacylglycerols (consisting of 7.4% 1,2-diacylglycerol and 6.0% 1,3-diacylglycerol) and 4.3% glycerol.

Another grade of GMO suitable for use in the present invention is comprised of about 90-100% monoglycerides (preferably about 95%), about 0-10% diglycerides (preferably about 4%) and about 0-2% triglycerides (preferably about 0.5%). It is preferred if this GMO has not less than 60% methyl oleate (preferably about 65%) and more preferred that the GMO also has not more than 35% methyl linoleate (preferably about 18-20%). The remaining fatty acid composition of the GMO is optionally not more than 12% methyl palmitate (preferably about 4%), not more than 6% methyl stearate (preferably about 2%), not more than 2% methyl linolenate, not more than 2% methyl arachidate, not more than 2% methyl eicosenate and not more than 6% free glycerine (preferably less than 1%).

Thus, in one embodiment the amphiphilic compound is a mixture of amphiphiles. Preferably, the amphiphilic compound contains a mixture of monoacylglycerols, diacylglycerols and glycerol. In particular, the mixture of amphiphiles is produced by reacting glycerol with canola oil. One suitable available amphiphilic compound contains 82% monoacylglycerols, 13.4% diacylglycerols and 4.3% glycerol. More particularly, the amphiphilic compound can contain:

82% monoacylglycerols consisting of 86.6% monoolein, 7.0% monostearin, 3.5% monopalmitin, 0.9% monoarachidin and 2.0% unidentified monoacylglycerols;

13.4% diacylglycerols consisting of 7.4% 1,2-diacylglycerol and 6.0% 1,3-diacylglycerol; and 4.3% glycerol.

In a further embodiment, the amphiphilic compound includes (i) a mixture of a mono- and/or di-glyceride of one or more fatty acids and (ii) one or more free fatty acids. Thus, the amphiphilic compound may include Myverol™ 18-99k and a fatty acid, such as oleic acid. In a further embodiment, the amphiphilic compound includes monoacylglycerol and oil.

The self-assembled particles are optionally selected from the following group: cubosomes, hexosomes, sponge particles and mixtures thereof, preferably cubosomes.

The self-assembled particles may form a bulk phase selected from the group consisting of micellar (normal and reversed), lamellar, hexagonal (normal and reversed), cubic (normal discrete, reversed discrete, reversed bicontinuous—including primitive, gyroid and diamond—and reversed discontinuous), and other 'intermediate phases' such as the ribbon, mesh, or non-cubic 'sponge' bicontinuous phases. See Israelachvili, J (1994), Chang (1998) and Kaasgard (2006) for more detail. In a preferred embodiment, the bulk phase is selected from cubic phase, hexagonal phase and mixtures thereof, preferably reversed bicontinuous cubic phase, preferably the diamond phase. Optionally, the bulk phase is lamellar phase. Optionally, the bulk phase is lamellar, reversed cubic or reversed hexagonal.

Without being bound by theory or mode of action, it is believed that the more complex the self-assembled particles and/or bulk phase, the slower the release of the active ingredient. Thus, the hexagonal and cubic, particularly diamond cubic, bulk phases are believed to result in the slowest release.

In one embodiment, the active ingredient is incorporated or dissolved within the self-assembled structure. Preferably, the active ingredient is non-covalently incorporated. The active ingredient is optionally in the form of a prodrug. In this embodiment, the active ingredient needs to be cleaved, for example by an enzyme or hydrolysis, either before or after absorption to form the active ingredient.

In preferred embodiments, the pharmaceutically acceptable disintegrant is present at an amount of about 1 to about 60% w/w of the ODT. In some embodiments the amount of pharmaceutically acceptable disintegrant is about 10 to about 50%, about 20 to about 60%, about 20 to about 50%, about 20 to about 40%, about 15 to about 40% w/w, about 20 to about 30% w/w, about 10 to about 20% w/w of the ODT. Alternatively, the ODT is prepared with low disintegrant content of about 1 to about 10% w/w of the ODT.

In some embodiments, the pharmaceutically acceptable disintegrant is selected from the group consisting of sodium starch glycolate, copovidone, crosslinked polyvinylpyrrolidone (crospovidone) or a derivative of crospovidone such as, crosslinked sodium carboxymethyl cellulose (croscarmellose sodium) sodium/calcium carboxymethylcellulose, sodium bicarbonate, microcrystalline cellulose, low-substituted hydroxypropylcellulose or sodium starch glycolate. It is possible to add crospovidone to the ODT independently or in the form of a blend such as Pharmaburst™, which contains 7-15% crospovidone.

Preferred formulations of the invention comprise two or more disintegrants. It is preferred if one of the two or more disintegrants is crospovidone. In some embodiments, the two or more disintegrants include both crospovidone and sorbitol copovidone. In some embodiments there are two disintegrants. These disintegrants are optionally crospovidone and copovidone or sodium starch glycolate and crospovidone.

Preferred formulations of the invention comprise three or more disintegrants. The three or more disintegrants are preferred to be crospovidone, copovidone and sodium starch glycolate.

Where the formulation includes crospovidone, the crospovidone is preferred to be about 5 to about 45%, about 10 to about 45% w/w of the formulation, about 15 to about 35% w/w of the formulation or about 20 to about 25% w/w of the formulation. Where the formulation includes crospovidone, and sodium starch glycolate, the preferred amounts of crospovidone are as above and the preferred amount of sodium starch glycolate is about 3 to about 8% w/w or about 5% w/w of the formulation.

In some embodiments, w/w ratio of amphiphilic compound to active ingredient is about 1:1 or more, about 4:1 or more, or about 7:1 or more, about 10:1 or more, about 50:1 or more or about 100:1 or more. Alternatively, the w/w ratio of amphiphilic compound to active ingredient is about 1:1, about 4:1 or about 7:1. It is also possible for the ratio of amphiphilic compound to active ingredient to be lower than 1:1, for example, 1:1.5, 1:2 or 1:3, particularly where the active ingredient has good water solubility. Higher ratios of amphiphilic compound to active ingredient are more likely where the dose of active ingredient is low.

Some early ODTs prepared by the inventors of the present invention (see, for example WO 2014/179845) were slow to disintegrate, for example, some formulations took 45 minutes or 30 minutes to disintegrate. There was a strong possibility that steps to improve disintegration time would affect the self-assembly of the liquid crystalline particles, the stability of those particles and/or the prolonged release of the active ingredient. The ODT has also been designed to maintain the ability to form the self-assembled particles or bulk phase and the prolonged release of the active ingredient.

All embodiments of the composition of the invention may further comprise additional pharmaceutically acceptable excipients such as one or more filler, binder, glidant, lubricant, osmotic agent, sweetener and/or flavour.

The ODT may further include a second active ingredient. It is preferred for the active ingredient and optional second active ingredient in the ODT to be micronized. The particle size of the active ingredient and optional second active ingredient in the ODT is preferred to be about 10 μm.

In some embodiments, the active ingredient is hydrophilic. In alternate embodiments, the active ingredient is lipophilic.

Optionally, the active ingredient has a log P of −0.5 to 6.4 or 0.3 to 6.4. Optionally, the active ingredient has a molecular weight of 100 to 1,200 g/mol. Optionally, the active ingredient has both a log P of −0.5 to 6.4 and a molecular weight of 100 to 1,200 g/mol.

In some embodiments, the active ingredient is about 0.05% to about 10% w/w or about 0.1% to about 6% w/w of the ODT. Optionally, the ratio of GMO to active ingredient is about 1:1 to 4:1 by weight.

Suitable active ingredients include statins, niacin, amoxicillin, clavulanic acid, trimethoprim, sulfamethoxazole, 5HT2c anti-serotonins, phenteramine, beta blockers, thiazide diuretics, steroids, ACE inhibitors, aspirin, paracetamol and ibuprophen or their derivatives. Other suitable active ingredients include oxycodone, adrenaline ie epinephrine, melatonin, atenolol, irinotecan, paclitaxel, atropine, haloperidol, levofloxacin, indomethacin, diazepam, trans retinol, prednisolone, progesterone, hydrocortisone, dexamethasone, paracetamol/acetaminophen and capecitabine. Suitable statins include, but are not limited to: atorvastatin, fluvastatin, lovastatin, mevastatin, pitavastatin, pravastatin, rosuvastatin, simvastatin and mixtures thereof. Statins used in the invention are optionally hydrophobic for a statin (ie lipophilic) but are preferably hydrophilic for a statin. Hydrophilic statins, including fluvastatin, pravastatin and rosuvastatin are less toxic than lipophilic statins, including atorvastatin, lovastatin and simvastatin. In a preferred embodiment, the pharmaceutical composition may further include any one or more of fluvastatin, pravastatin and rosuvastatin.

In some embodiments, the ODT according to the current invention are prepared by spray drying, thermoplastic granulation, wet granulation or any of these processes followed by mixing with further ingredients. Preferred formulations are prepared by wet granulation.

The present invention has a number of specific forms. Additional embodiments are of these forms are as discussed elsewhere in the specification. The following aspects of the invention further describe options for administration of the ODT. For example, in a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the ODT is mucoadhesive.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the ODT is for sublingual administration.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the ODT is for sublingual administration, the ODT is administered to the oral mucosa and following administration the tablet disintegrates and the amphiphilic compound self-assembles into liquid crystalline particles.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in 1 to 60 seconds, preferably 1 to 10 seconds.

The following aspects of the invention further describe options for formation of the liquid crystalline particles. For example, in a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the tablet is administered to the oral mucosa and following administration the tablet disintegrates and the amphiphilic compound self-assembles into liquid crystalline particles.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the liquid crystalline particles formed upon contact with a hydrophilic solvent form a bulk phase of liquid crystalline particles.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the liquid crystalline particles formed upon contact with a hydrophilic solvent form a cubic bulk phase.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the liquid crystalline particles formed upon contact with a hydrophilic solvent forms a lamellar bulk phase.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the liquid crystalline particles form a bulk phase and the bulk phase is hexagonal phase.

In a further aspect the present invention provides an ODT for administration to oral mucosa comprising an amphiphilic compound capable of self-assembling into liquid crystalline particles when contacted with a hydrophilic solvent having physiological pH, physiological temperature and physiological salinity, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes.

The following aspects of the invention further describe the release of the active ingredient from the ODT. For example, in a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the release of the active ingredient is prolonged release relative to either an immediate release ODT or an immediate release tablet.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the maximum blood concentration of the active ingredient occurs over 30 minutes following administration of the ODT.

The following aspects of the invention further describe options for stability of the ODT. For example, in a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the ODT retains 95% or more active ingredient following storage at either 25° C./60% relative humidity or 5° C. for at least 6 months. Optionally, the active ingredient is a statin and there is also no change in lactone or 5-oxo-rosuvastatin calcium levels following storage at 5° C. for at least 6 months and/or less than 0.5% w/w lactone and less than 0.4% w/w 5-oxo-rosuvastatin calcium following storage at 25° C./60% relative humidity for at least 6 months.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein as the tablet disintegrates, the amphiphilic compound self-assembles into liquid crystalline particles, wherein the amphiphilic compound is glycerol monoleate and the ODT retains 95% or more active ingredient following storage at either 25° C./60% relative humidity or 5° C. for at least 6 months.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein as the tablet disintegrates, the amphiphilic compound self-assembles into liquid crystalline particles, wherein the amphiphilic compound is glycerol monoleate, the active ingredient is a statin, preferably rosuvastatin and the ODT retains 95% or more active ingredient following storage at either 25° C./60% relative humidity or 5° C. for at least 6 months.

The following aspects of the invention further describe options for ingredients of the ODT. For example, in a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the active ingredient is lipophilic.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the active ingredient is hydrophilic.

In a further aspect the present invention provides an oral disintegrating tablet (ODT) for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the active ingredient has a log P of −0.5 to 6.5.

In a further aspect the present invention provides an oral disintegrating tablet (ODT) for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the amphiphilic compound has a critical packing parameter (CPP) of >½ and/or a hydrophilic lipophilic balance (HLB) of 0 to >10. Optionally, the CPP is >1 and the HLB is 1 to <8.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the active ingredient is a statin, preferably rosuvastatin.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the amphiphilic compound is present at an amount of about 1 to 20% w/w of the ODT.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the disintegrant is sodium starch glycolate, cross-linked polyvinylpyrrolidone or both.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein the amphiphilic compound is a mono- and/or di-glyceride of a fatty acid comprising a 6 to 24 carbon chain, preferably glycerol monoleate.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein as the tablet disintegrates, the amphiphilic compound self-assembles into liquid crystalline particles and wherein the amphiphilic compound is glycerol monoleate.

In a further aspect the present invention provides an ODT for administration to oral mucosa comprising an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes, wherein as the tablet disintegrates, the amphiphilic compound self-assembles into liquid crystalline particles, wherein the amphiphilic compound is glycerol monoleate and wherein the active ingredient is a statin, preferably rosuvastatin.

The invention also provides for the use of an ODT of the invention as described in any one of the embodiments in this specification in treating or preventing a disease state.

In an alternate aspect, the invention provides a method of administering an active ingredient to the oral mucosa of a mammal, particularly a human, comprising administration of an ODT including an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes. Other embodiments of the ODT used in the method are as described throughout this patent.

In some embodiments, the active ingredient is a statin (preferably rosuvastatin). In those embodiments, the method reduces a subject's total cholesterol, treats or prevents the development of dyslipidaemia, preferably hyperlipidaemia, cardiovascular disease and/or atherosclerosis. Alternatively or in addition, the method treats or prevents statin-intolerance, preferably statin-induced myalgia, statin-induced myositis and/or statin-induced myopathy.

In a further aspect, the present invention provides a method for confirming that an ODT according to the invention self assembles into liquid crystalline particles following contact with a hydrophilic solvent comprising dissolving an ODT according to the invention in a hydrophilic solvent to produce a suspension and analysing the suspension using the SAXS/WAXS beamline of a synchrotron to determine if liquid crystalline particles are present. Optionally, the exposure time is 5 seconds. Optionally the suspension is prepared at ambient temperature (eg about 22° C.) and the analysis occurs at ambient temperature (eg about 22° C.).

In a further aspect, the present invention provides a method of administering an active ingredient via the oral mucosa comprising administration of the ODT of the invention and/or use of an active ingredient in the preparation of a medicament for the treatment of a disease or disorder by administration to the oral mucosa, wherein the medicament is an oral disintegrating tablet of the invention.

The present invention provides a method of administering an active ingredient via the oral mucosa to a subject in need thereof comprising administering an ODT to the oral mucosa, wherein the ODT comprises an amphiphilic compound capable of self-assembling into liquid crystalline particles when contacted with a hydrophilic solvent, a therapeutically effective amount of an active ingredient and a pharmaceutically acceptable disintegrant, wherein the disintegrant is about 1 to about 60% w/w of the tablet and the oral disintegrating tablet disintegrates in less than 2 minutes. The ODT administered in the method may have the additional features described elsewhere in the specification.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
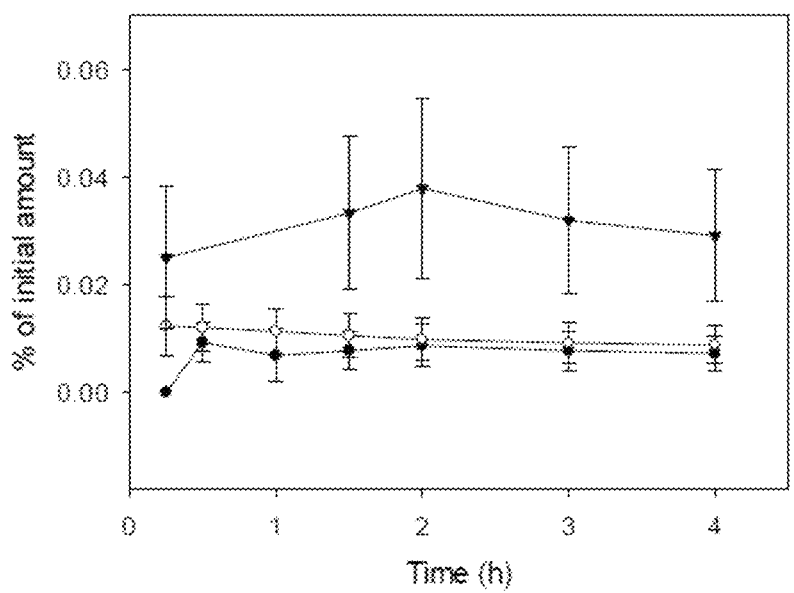
FIG. 1—Appearance of rosuvastatin in the receptor chamber after application of mixtures containing GMO and rosuvastatin at a ratio of 1:1 (closed circle), 5:1 (open circle) and 7:1 (closed triangle) to porcine buccal mucosa in the donor chamber of a modified Ussing Chamber. Data are presented as mean±SD (n=4-5).

It will be understood that the invention disclosed and defined in this specification extends to all alternative combinations of two or more of the individual features mentioned or evident from the text or drawings. All of these different combinations constitute various alternative aspects of the invention.

Reference will now be made in detail to certain embodiments of the invention. While the invention will be described in conjunction with the embodiments, it will be understood that the intention is not to limit the invention to those embodiments. On the contrary, the invention is intended to cover all alternatives, modifications, and equivalents, which may be included within the scope of the present invention as defined by the claims.

Further aspects of the present invention and further embodiments of the aspects described in the preceding paragraphs will become apparent from the following description, given by way of example.

All of the patents and publications referred to herein are incorporated by reference in their entirety.

For purposes of interpreting this specification, terms used in the singular will also include the plural and vice versa.

One skilled in the art will recognize many methods and materials similar or equivalent to those described herein, which could be used in the practice of the present invention. The present invention is in no way limited to the methods and materials described.

The inventors of the present invention have developed an ODT that allows for slowed release of an active ingredient to avoid the difficulties associated with the speed of delivery of an active ingredient through the oral mucosa. The ODT developed also disintegrates rapidly. Consequently, the ODT of the present invention has the convenience of fast disintegration while at the same time providing slowed delivery of the active ingredient (when compared to a traditional ODT).

As used herein, 'therapeutically effective amount' relates to the amount or dose of a compound or composition thereof that will lead to one or more desired effects, for example, the reduction of cholesterol synthesis. A therapeutically effective amount of an active ingredient will vary according to factors such as the disease state, age, sex, and weight of a subject, and the ability of the substance to elicit a desired response in the subject.

The term 'self-assembled particles' as used throughout the specification is understood to mean an aggregate of amphiphiles that possess some degree of internal organisational order, for example, a colloidal particle or colloidosome or a solid lipid particle. The particles can be either nanoparticles or microparticles depending on their average size, typically less than about 1 μm, preferably in a range of about 10 nm to about 500 nm, more commonly about 200 nm. Solid lipid nanoparticles are a dispersed crystalline lamellar lipidic material. The self-assembled particles are formed by contacting the amphiphile with solvent. In some embodiments, the self-assembled particles themselves aggregate into a bulk lyotropic phase.

The term 'bulk phase' as used throughout the specification is understood to mean a lyotropic phase that includes but is not limited to: micellar cubic (I1); normal hexagonal (H1); bicontinuous cubic (V1); lamellar (L); reversed bicontinuous cubic (V2); reversed hexagonal (H2); reversed micellar cubic (I2) and sponge (L3) phases.

The term 'cubic phase' as used throughout the specification is understood to refer to two main classes of phases: micellar cubic and bicontinuous cubic. 'Micellar cubic phase' refers to a phase consisting of spherical micelles arranged in a cubic array. A 'normal micellar cubic phase' or 'II phase' consists of spherical normal micelles arranged in a cubic array, whilst an 'inverse micellar cubic phase' or 'III phase' consists of spherical inverse micelles arranged in a cubic array. 'Bicontinuous cubic phase' refers to a family of closely related phases that consist of a single curved lipid bilayer that forms a complex network that separates the polar solvent space into two continuous, but non-intersecting volumes. Bicontinuous cubic phases possess long range order based upon a cubic unit cell. Bicontinuous cubic phases have zero mean curvature; that is, at all points on surface of the amphiphile bilayer, the surface is as convex as it is concave. Bicontinuous cubic phases include the normal ('vI phase') or reverse ('vII phase') type. Several types of long range orientational orders have been observed for bicontinuous cubic phases; the orientational order in these phases correspond to space groups Ia3d, Pn3m, and Im3m. When a colloidosome possesses the internal structure of a bulk cubic phase the colloidosome is referred to as a 'cubosome'.

The term 'hexagonal phase' as used throughout the specification is to be understood to mean an amphiphile phase consisting of long, rod-like micelles packed into a hexagonal array. A 'normal hexagonal phase' is a hexagonal phase consisting of long, rod-like normal micelles, whilst an 'inverse hexagonal phase' is a hexagonal phase consisting of long, rod-like inverse micelles. The normal hexagonal phase is also referred to as the 'HI phase' and the inverse hexagonal phase is also referred to as the 'HII phase'. When a colloidosome possesses the internal structure of a bulk hexagonal phase the colloidosome is referred to as a 'hexosome'.

The term 'lamellar phase' as used throughout the specification is to be understood to mean a stacked bilayer arrangement, where opposing monolayers of the hydrophilic portion of amphiphile molecules are separated by a polar solvent domain, while the hydrophobic portion of the amphiphile molecule of the back-to-back layers are in intimate contact to form a hydrophobic layer. The planar lamellar phase is referred to as the 'La phase'. There are three lamellar phases, (1) the fluid lamellar phase (Lα) where the chains are melted, (2) the gel lamellar phase (L3) where the chains are mostly melted but some degree of short range order and (3) the lamellar crystalline phase (Lc), where the chains are crystalline with very short range order.

The term 'sponge phase' or 'L3 phase' as used throughout the specification refers to a phase that resembles a bicontinuous cubic phase, in that it possesses an amphiphile bilayer that separates the polar solvent space into two unconnected volumes, but it does not possess long range order. Accordingly, these phases are analogous to a 'melted cubic phase'.

The term 'prodrug' as used throughout the specification refers to a biologically active agent including structural modifications thereto, such that in vivo the prodrug is converted, for example, by hydrolytic, oxidative, reductive or enzymatic cleavage to the biologically active agent by one or more reactions or steps. It includes an agent that requires one or more chemical conversion steps or steps of metabolism to produce the active molecule.

The liquid crystalline particles of the present invention may self-assemble into bulk phase including an active ingredient. Typically, a bulk material having a certain phase will form from an amphiphile, that is, a molecule that possesses both a hydrophilic portion and a hydrophobic portion. The self-assembly behaviour of amphiphiles in solvent arises because of the preferential interaction between the solvent and either the hydrophilic or hydrophobic portion of the amphiphilic molecule. When an amphiphile is exposed to a polar solvent, the hydrophilic portion of the amphiphile tends to preferentially interact with the polar solvent, resulting in the formation of hydrophilic domains. The hydrophobic portion of the amphiphile molecules tend to be excluded from this domain, resulting in the de facto formation of a hydrophobic domain.

It is in a self-assembled form that amphiphiles are capable of acting as an inert carrier or matrix into which biologically active molecules, such as an active ingredient, may be incorporated. The nanoscale porosity of the self-assembled materials provides a high internal and external surface area. An active ingredient that is distributed within a region of this material is believed to be distributed in an ordered arrangement, and at a high loading concentration due to the large internal and external liquid crystal surface area. Self-assembled bulk phase may exhibit a variety of orientational orders. If long-range orientational order is observed within the self-assembled bulk phase at equilibrium, the self-assembled bulk phase is termed a 'mesophase', a 'lyotropic liquid crystalline phase', a 'lyotropic phase' or, as used herein, simply a 'phase'.

There are 2 principal types of liquid crystalline phases: thermotropic liquid crystals and lyotropic liquid crystals. Thermotropic liquid crystals can be formed by heating a crystalline solid or by cooling an isotropic melt of an appropriate solute. Lyotropic liquid crystals can be formed by addition of a solvent to an appropriate solid or liquid amphiphile. The manipulation of parameters such as amphiphile concentration and chemical structure, solvent composition, temperature and pressure may result in the amphiphile-solvent mixture adopting lyotropic phases with distinctive characteristics.

Examples of particular phases that can be formed by self-assembled particles are set out above. It is possible to disperse the bulk phases described above to form colloidal particles (so-called 'colloidosomes') that retain the internal structure of the non-dispersed bulk phase. When these particles possess the internal structure of a reversed bicontinuous cubic phase, the particles are colloquially referred to as cubosomes. Similarly, when the particles possess the internal structure of a reversed hexagonal phase, they are referred to as hexosomes. When the particles possess the internal structure of a lamellar phase, they are referred to as liposomes.

Whilst the bulk materials can be of use in some circumstances, the use of bulk materials having cubic phases in drug administration is limited by their high viscosity making them difficult to administer. In these cases, colloidal dispersions of particles of these phases may be used in drug delivery. More preferred phases for use as drug delivery vehicles are bicontinuous cubic phase or reversed hexagonal phase. The inverse cubic phase affords distinct aqueous regions that form two continuous water networks (or channels) throughout the cubic phase that more readily allow diffusion of an active ingredient. The inverse cubic liquid crystal phase is thermodynamically stable and co-exists in equilibrium with excess water over a broad temperature range. Alternatively, if the bicontinuous cubic phase is viscous and difficult to administer it may be possible to administer a lamellar phase material that converts into the cubic phase upon dissolution with aqueous, water rich, body fluids (thus facilitating the conversion of one phase to another). For example, a suitable material is a phospholipid such as 1,2-dioleoyl-sn-glycero-3-phosphocholine. The cubic phase in situ provides a viscous depot from which an active ingredient can slowly be released. An inverse cubic liquid crystal phase provides an appropriate scaffold in which to distribute or load the niacin compound owing to the high surface area of the internal liquid crystal structure (up to 400 m$^2$/g).

Suitable pharmaceutical carriers, excipients, diluents, additives and vehicles are known to those skilled in the art.

The formulation may include one or more binders such as hydroxypropylmethylcellulose (HPMC), ethyl cellulose, acacia, polyvinyl alcohol (PVA), and polyvinylpyrrolidone (Povidone).

The formulation may include one or more glidants such as talc, magnesium trisilicate and colloidal silicon dioxide.

The formulation may include one or more fillers such as lactose, mannitol, sorbitol, starch, maltodextrin, acacia and silicon dioxide.

The formulation may include one or more lubricants such as glyceryl behenate, stearic acid, talc, zinc stearate, calcium stearate, magnesium stearate, aluminum stearate and sodium stearyl fumarate.

If the formulation is prepared by thermoplastic granulation the formulation may include thermoplastic granulation agents such as glycerol monostearate and glyceryl behenate.

The presence of liquid crystalline phase can be determined using the SAX/WAX beamline of a synchrotron, cross polarised light microscopy (CPLM) or Cry-Em. In certain circumstances, such as a low proportion of amphiphilic compound in the ODT, liquid crystalline phase may not be identified using the SAX/WAX beamline of the synchrotron and an alternative, such as, CPLM may be preferred. CPLM can identify LC structures but does not provide information on the internal phase.

The CPP of an amphiphilic compound can be determined by quantum mechanics molecular simulations to determine geometrical and quantitative structure-activity relationship (QSAR) values. See, Fong 2016. The HLB of an amphiphilic compound is calculated based on the number and identity of hydrophilic/lipophilic groups.

The CPP and HLB of some amphiphilic compounds are in Table A.

TABLE A

CPP and HLB for various amphiphilic compounds

| Amphiphile | CPP | V | A$_0$ | L$_C$ | HLB |
|---|---|---|---|---|---|
| Phytantriol | 0.650 | 303.5 | 27.9 | 16.8 | 6.36 |
| Monolinolein | 1.016 | 341.0 | 22.6 | 14.8 | 1.02 |
| Glucose stearate | 0.456 | 315.3 | 31.2 | 22.2 | 9.28 |
| Fructose stearate | 0.421 | 315.3 | 33.8 | 22.2 | 9.28 |

The active ingredients melatonin and atenolol have been shown to load and release from a monoolein-water liquid crystalline system previously and are expected to be compatible with the ODT of this invention. Atropine, haloperidol, levofloxacin, indomethacin, diazepam, trans retinol, prednisolone, progesterone, hydrocortisone and dexamethasone have been shown to load an release from monoolein and/or phytantriol liquid crystals previously and are expected to be compatible with the ODT of this invention. Irinotecan and paclitaxel has also been released from inverse hexagonal phase previously and are expected to be compatible with the ODT of this invention.

The log P and molecular weight for some active ingredients are in Table B below.

TABLE B

LogP and molecular weight for various active ingredients

| API | MW (g/mole) | logP |
|---|---|---|
| Atorvastatin | 1155.4 | 6.36 |
| Oxycodone | 351.9 | 0.3 |
| Adrenaline | 183.2 | −0.5 to −1.2 |
| Rosuvastatin | 1001.1 | 1.80 at pH 5 |
| | | 0.30 at pH 7 |
| Niacin | 123.1 | 0.36 |

REFERENCES

The text of each of the following references is incorporated by reference into this specification.

Caffrey, M.; Cheng, A., Kinetics of lipid phase changes. Curr. Opin. Struct. Biol. 1995, 5, 548-555.

Chang, C.-M.; Bodmeier, R., Low viscosity monoglyceride-based drug delivery systems transforming into a highly viscous cubic phase. Int. J. Pharm. 1998, 173, 51-60.

Clogston, J.; Rathman, J.; Tomasko, D.; Walker, H.; Caffrey, M., Phase behavior of a monoacylglycerol (Myverol 18-99K)/water system. Chem. Phys. Lipids 2000, 107, 191-220.

Drummond, C. J.; Fong, C., Surfactant self-assembly objects as novel drug delivery vehicles. Current Opinion in Colloid & Interface Science 1999, 4, 449-456.

Fong, W et al, Dynamic formation of nanostructured particles from vesicles via invertase hydrolysis for on-demand delivery, *The Royal Society of Chemistry: Electronic Supplementary Material (ESI) for RSC Advances*, 2016, S1-S22.

Gu, X et al, Is epinephrine administration by sublingual tablet feasible for the first-aid treatment of anaphylaxis? A proof-of-concept study. *Biopharm Drug Dispos.* 2002, 23(5):213-6.

Hyde, S. T., Bicontinuous structures in lyotropic liquid crystals and crystalline hyperbolic surfaces. *Current Opinion in Solid State and Materials Science* 1996, 1, 653-662.

Israelachvili, J., The science and applications of emulsions—an overview. Colloids Surf. Physico chem. Eng. Aspects, 1994, 91, 1-8.

Kaasgaard, T.; Drummond, C. J., Ordered 2-D and 3-D nanostructured amphiphile self-assembly materials stable in excess solvent. *Phys. Chem. Chem. Phys.* 2006, 8, 4957-4975)

World Intellectual Property Office publication, WO 2014/179845.

Example 1—Formulations with 1:1 w/w Ratio of Statin and Amphiphile (SBT176/SBT226), Oxycodone and Amphiphile (SBT227) and Adrenaline and Amphiphile (SBT237)

TABLE 1

ODT with 1:1 GMO to statin (SBT176)

| Ingredient | % w/w | Function |
|---|---|---|
| Pharmaburst-(co-processed mixture of Mannitol, Sorbitol Crospovidone & Silicon dioxide) | 68.67 | Filler, Taste masking, Disintegration agent. |
| Crospovidone XL | 15.00 | Disintegration agent |
| Sodium Chloride | 0.25 | Osmotic agent |
| Sodium Cyclamate | 0.60 | Sweetener |
| Saccharin Sodium | 0.40 | Sweetener |
| Menthol (Optional) | 0.20 | Flavouring agent |
| Rosuvastatin Calcium (micronized) | 5.44 | Drug substance/API |
| Povidone (Poly vinyl pyrrolidone) | 1.50 | Binder |
| Glyceryl Monooleate (GMO) | 5.44 | Bio adhesive/Mucoadhesive agent, Gelling agent, nonionic surfactant, sustained release agent |
| Sodium Starch Glycolate | 5.00 | Disintegration agent |
| Colloidal Silicon Dioxide | 1.50 | Glidant |
| Magnesium Stearate | 1.00 | Lubricant |
| Ethanol | N/A * | Solvent |

* Evaporated during the drying process.

8 mm round tablets of this formulation were stability tested at 5° C. for 9 months. Assay of the 5 mg rosuvastatin showed 97.1% at t=0, 98.1% at t=3 months, 95.8% at t=6 months and 96% at t=9 months. The formulation was also stability tested at 25° C./60% RH for 9 months. Assay of the 5 mg rosuvastatin showed 97.1% at t=0, 94.2% at t=3 months, 96.1% at t=6 months and 94.4% at t=9 months. In addition, the assay of the tablets showed 0.03% at t=0, 0.16% at t=3 months, 0.20% at t=6 months and 0.34% at t=9 months of rosuvastatin in the lactone form and 0.15% at t=0, 0.25% at t=3 months, 0.29% at t=6 months and 0.34% at t=9 months of 5-oxo-rosuvastatin calcium (TP-13 impurity 1) at following storage at 25° C./60% RH. The assay of the tablets also showed 0.03% at t=0, 0.03% at t=3 months, 0.03% at t=6 months and 0.06% at t=9 months of rosuvastatin in the lactone form and 0.15% at t=0, 0.18% at t=3 months, 0.17% at t=6 months and 0.21% at t=9 months of the 5-oxo-rosuvastatin calcium at both 3 and 6 months at 5° C.

The structure of 5-oxo-rosuvastatin calcium is below.

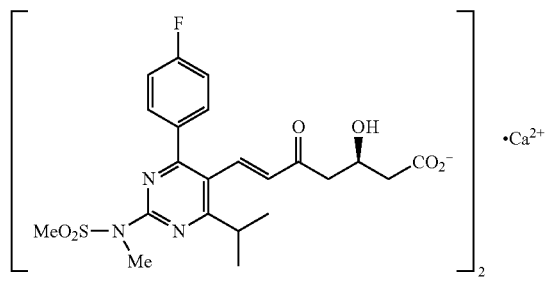

A placebo ODT (SBT183) was also prepared with the formulation of SBT 176 except there is no active ingredient (rosuvastatin).

A second statin containing ODT was prepared using 5.42% w/w of atorvastatin calcium trihydrate and the same amount of GMO. The crospovidone was reduced to 10% w/w and the Pharmaburst increased to 68.21% w/w. The ODT (SBT226) had a 1:1 ratio of GMO to atorvastatin calcium trihydrate and 10 mg atorvastatin calcium trihydrate.

A third ODT (SBT227) was prepared using 5% w/w of oxycodone hydrochloride and the same amount of GMO. The crospovidone was also reduced to 10% w/w and the Pharmaburst increased to 69.55% w/w. The ODT (SBT226) had a 1:1 ratio of GMO to oxycodone hydrochloride and 5 mg oxycodone hydrochloride.

A fourth ODT (SBT237) containing 300 µg adrenaline was prepared with a 1:1 ratio of GMO to adrenaline. The formulation is in Table 1A below.

TABLE 1A

ODT with 1:1 GMO to adrenaline (SBT237)

| Material Name | % w/w | Notes |
|---|---|---|
| Pharmaburst-(co-processed mixture of Mannitol, Sorbitol Crospovidone & Silicon dioxide) | 77.78 | Filler, Taste masking, Disintegration agent. |
| Crospovidone XL | 10.68 | Disintegration agent |
| Sodium Chloride | 0.28 | Osmotic agent |
| Sodium Cyclamate | 0.68 | Sweetener |
| Saccharin Sodium | 0.45 | Sweetener |
| Menthol | 0.23 | Flavouring agent |
| Epinephrine (Adrenaline) | 0.34 | Drug substance/API |
| Povidone (Poly vinyl pyrrolidone) | 1.70 | Binder |
| Glyceryl Monooleate (GMO) | 0.34 | Bio adhesive/Mucoadhesive agent, Gelling agent, nonionic surfactant, sustained release agent |
| Sodium Starch Glycolate | 5.00 | Disintegration agent |
| Colloidal Silicon Dioxide | 1.50 | Glidant |
| Magnesium Stearate | 1.00 | Lubricant |
| Ethanol | N/A * | Solvent |

Example 2—Formulations with 1:4 w/w Ratio of Statin and Amphiphile (SBT 177/SBT233), a 1:4 w/w Ratio Oxycodone and Amphiphile (SBT232) and a 10:1 w/w Ratio of Adrenaline and Amphiphile (SBT238)

TABLE 2

ODT with 4:1 GMO to statin (SBT177)

| Ingredient | % w/w | Function |
|---|---|---|
| Pharmaburst-(co-processed mixture of Mannitol, Sorbitol Crospovidone & Silicon dioxide) | 64.47 | Filler, Taste masking, Disintegration agent. |
| Crospovidone XL | 15.00 | Disintegration agent |
| Sodium Chloride | 0.25 | Osmotic agent |
| Sodium Cyclamate | 0.60 | Sweetener |
| Saccharin Sodium | 0.40 | Sweetener |
| Menthol | 0.20 | Flavouring agent |
| Rosuvastatin Calcium (micronized) | 1.81 | Drug substance/API |
| Povidone (Poly vinyl pyrrolidone) | 2.50 | Binder |
| Glyceryl Monooleate (GMO) | 7.26 | Bio adhesive/Mucoadhesive agent, Gelling agent, nonionic surfactant, sustained release agent |
| Sodium Starch Glycolate | 5.00 | Disintegration agent |
| Colloidal Silicon Dioxide | 1.50 | Glidant |
| Magnesium Stearate | 1.00 | Lubricant |
| Ethanol | N/A * | Solvent |

* Evaporated during the drying process.

12 mm round tablets of this formulation were stability tested at 5° C. for 6 months. Assay of the 5 mg rosuvastatin showed 100.1% at t=0, 100.4% at t=3 months and 97.9% at t=6 months. The formulation was also stability tested at 25° C./60% RH for 6 months. Assay of the 5 mg rosuvastatin showed 100.1% at t=0, 98.6% at t=3 months and 97.6% at t=6 months. In addition, the assay of the tablets showed 0.05% at t=0, 0.31% at t=3 months and 0.49% at t=6 months of rosuvastatin in the lactone form and 0.3% at t=0, 0.31% at t=3 months and 0.36% at t=6 months of 5-oxo-rosuvastatin calcium (TP-13 impurity 1) at following storage at 25° C./60% RH. The assay of the tablets also showed 0.05% at t=0, 0.08% at t=3 months and 0.05% at t=6 months of rosuvastatin in the lactone form and 0.3% at t=0, 0.23% at t=3 months and 0.24% at t=6 months of the 5-oxo-rosuvastatin calcium at both 3 and 6 months at 5° C.

A second ODT (BT233) containing 10 mg atorvastatin was prepared with a 4:1 ratio of GMO to atorvastatin. The formulation is in Table 2A below.

TABLE 2A

ODT with 4:1 GMO to atorvastatin (SBT233)

| Ingredient | % w/w | Function |
|---|---|---|
| Pharmaburst-(co-processed mixture of Mannitol, Sorbitol Crospovidone & Silicon dioxide) | 58.86 | Filler, Taste masking, Disintegration agent. |
| Crospovidone XL | 13.82 | Disintegration agent |
| Sodium Chloride | 0.22 | Osmotic agent |
| Sodium Cyclamate | 0.53 | Sweetener |
| Saccharin Sodium | 0.41 | Sweetener |
| Menthol | 0.21 | Flavouring agent |
| Atorvastatin Calcium Trihydrate | 3.19 | Drug substance/API |
| Povidone (Poly vinyl pyrrolidone) | 2.50 | Binder |
| Glyceryl Monooleate (GMO) | 12.76 | Bio adhesive/Mucoadhesive agent, Gelling agent, nonionic surfactant, sustained release agent |

TABLE 2A-continued

ODT with 4:1 GMO to atorvastatin (SBT233)

| Ingredient | % w/w | Function |
|---|---|---|
| Sodium Starch Glycolate | 5.00 | Disintegration agent |
| Colloidal Silicon Dioxide | 1.50 | Glidant |
| Magnesium Stearate | 1.00 | Lubricant |
| Ethanol | N/A * | Solvent |

A third ODT (SBT232) was prepared in accordance with Table 2 but using 1.67% w/w of oxycodone hydrochloride and four times as much GMO (6.67% w/w). The crospovidone was also reduced to 10% w/w and the Pharmaburst increased to 65.22% w/w, when compared to the rosuvastatin formulation in Table 2. The ODT (SBT232) had a 4:1 ratio of GMO to oxycodone hydrochloride and 5 mg oxycodone hydrochloride.

A fourth ODT (SBT238) containing 300 μg adrenaline was prepared with a 10:1 ratio of GMO to adrenaline. The formulation is in Table 2B below.

TABLE 2B

ODT with 1:1 GMO to adrenaline (SBT238)

| Material Name | % w/w | Notes |
|---|---|---|
| Pharmaburst-(co-processed mixture of Mannitol, Sorbitol Crospovidone & Silicon dioxide) | 70.97 | Filler, Taste masking, Disintegration agent. |
| Crospovidone XL | 16.00 | Disintegration agent |
| Sodium Chloride | 0.28 | Osmotic agent |
| Sodium Cyclamate | 0.66 | Sweetener |
| Saccharin Sodium | 0.44 | Sweetener |
| Menthol | 0.22 | Flavouring agent |
| Epinephrine (Adrenaline) | 0.11 | Drug substance/API |
| Povidone (Poly vinyl pyrrolidone) | 2.76 | Binder |
| Glyceryl Monooleate (GMO) | 1.10 | Bio adhesive/Mucoadhesive agent, Gelling agent, nonionic surfactant, sustained release agent |
| Sodium Starch Glycolate | 4.97 | Disintegration agent |
| Colloidal Silicon Dioxide | 1.49 | Glidant |
| Magnesium Stearate | 0.99 | Lubricant |
| Ethanol | N/A * | Solvent |

Example 3—Manufacture of the Formulations in Example 1 and Example 2

Process for Wet Granulation Manufacturing:
  Rosuvastatin calcium was dispersed in melted GMO
  Povidone, Menthol & Sacharin Sodium was dissolved in ethanol
  Pharmaburst, Sodium chloride, Sodium cyclamate Crospovidone were granulated with the Rosuvastatin: GMO suspension and the Povidone solution
  The granules were dried and milled.
  The milled granules were blended with the remaining excipients to form the final blend for compression.
  The tablets prepared by this method achieve 100% dissolution within 5 minutes (Dissolution apparatus II, paddles, 50 rpm, 900 ml, Citrate buffer pH 6.6).
  Manufacture of the atorvastatin calcium trihydrate, oxycodone hydrochloride and epinephrine (adrenaline) ODTs also used this method.

Example 4—Disintegration Time for the Formulations in Example 1 and Example 2

The formulations in Examples 1 and 2 were subjected to in vitro disintegration testing. Dissolution testing is not sufficiently precise for this purpose. An active ingredient can take about 5 minutes to be homogeneously dissolved in a 900 ml dissolution testing vessel, therefore, dissolution results taken earlier than 5 minutes are not reliable.

Disintegration testing was conducted in a basket-rack assembly and in accordance with Appendix XII A. Disintegration of the European Pharmacopoiea edition 9.0 (Ph. Eur. Method 2.9.1). The solvent was water at 37° C.

The rosuvastatin formulation in Example 1 disintegrated within 20 to 40 seconds of administration. The rosuvastatin formulation in Example 2 disintegrated within 40 to 90 seconds of administration.

Without being bound by theory, it is thought that the increase in the amount of GMO, the slightly lowered quantity of disintegrant or both in the 4:1 GMO to statin formulation of Example 2 slowed disintegration when compared to the 1:1 GMO to statin formulation in Example 1.

The oxycodone ODT in Example 1 disintegration within 20-30 seconds and the oxycodone ODT in Example 2 disintegrated within 45-70 seconds. The adrenaline ODT in Example 1 disintegrated within 15-35 seconds and the adrenaline ODT in example 2 disintegrated within 25-35 seconds.

Example 5—Synchrotron Testing to Confirm Formation of Liquid Crystalline Particles Preparation of Samples Tablets for Simulated Dissolution Study For equilibrium samples, the tablets were loaded into a transparent polystyrene 96 well plate (Nunc™) and immersed in PBS buffer (pH 6.8). The samples were stored away from light at ambient temperature overnight prior to SAXS experiment.

For the kinetic study of SBT122 and SBT123, 2 tablets were carefully placed in a transparent polystyrene 24 well plate (2 ml per well) to ensure the X-ray beam can transmit through the tablets. The X-ray diffraction patterns were first taken without any solution added. The tablets were then immersed in 2 mL of PBS buffer or saliva donated by the author and other volunteers, the X-ray diffraction patterns were taken overtime, up to 4 hours.

For the kinetic study of SBT177, 2 tablets were disintegrated in PBS using 2 ml vials, the 0.4 ml carefully placed in a transparent polystyrene 96 well plate (0.4 ml per well). The X-ray diffraction patterns were taken overtime, up to 4 hours.

Small Angle x-Ray Scattering (SAXS) Setup

The SAXS/WAXS beamline at Australian Synchrotron, Melbourne, Australia was used to determine the liquid crystalline nanostructure in the samples.

A custom-designed plate holder was used to mount the samples plate directly onto the SAXS/WAXS beamline. Scans were automated using a pre-loaded set of position variables based on the well positions within the plate, the exposure time was 5 seconds. For the kinetic study of SBT177 a single location was tested.

Data were obtained at ambient temperature (~22° C.). The experiments used a beam of wavelength $\lambda=1.033$ Å (12.0 keV) and a typical flux of $1.2\times10^{13}$ photons/s. The 2-D diffraction images were recorded on a Pilatus 1M detector and radially integrated using the in-house software "ScatterBrain".

The liquid crystal phase structures were determined by indexing the Bragg peaks according to their corresponding reflection laws (see Hyde, S. T., Bicontinuous structures in lyotropic liquid crystals and crystalline hyperbolic surfaces. *Current Opinion in Solid State and Materials Science* 1996, 1, 653-662).

Results

TABLE 3

Liquid crystalline structure results

| Formulation tested | Structure obtained |
|---|---|
| SBT122 (1:1) | Pn3m |
| SBT123 (7:1) | Pn3m/Im3m and Im3m |
| SBT183 (1:1) | Pn3m |
| SBT177 (4:1) | Pn3m |

Further testing was conducted, using the protocol above but having some ODT samples hydrated for 30 min before testing and some for 18 hours before testing. Each sample was tested at 125 times/locations. The results are in table 4 below. The results were the same for the 30 min and 18 hour hydrated samples.

TABLE 4

Liquid crystalline structure results

| API | Batch number | Structure produced-Plate 1: Hydration 18 hrs | Structure produced-Plate 2: Hydration 30 minutes |
|---|---|---|---|
| Oxycodone 5 mg 1:1 | SBT227 | Cubic Pn3m & Im3m | Cubic Pn3m & Im3m |
| Oxycodone 5 mg 4:1 | SBT232 | Cubic Pn3m | Cubic Pn3m |
| Atorvastatin 10 mg 1:1 | SBT226 | Double Lamellar | Double Lamellar |
| Atorvastatin 10 mg 4:1 | SBT233 | Double Lamellar | Double Lamellar |
| Adrenaline (Epinephrine) 0.3 mg 1:1 | SBT237 | Hexagonal | Double Lamellar |
| Adrenaline (Epinephrine) 0.3 mg 10:1 | SBT238 | Hexagonal & Cubic Pn3m | Hexagonal |
| Rosuvastatin 5 mg 1:1 | SBT176 | Lamellar | Lamellar |
| Rosuvastatin 5 mg 1:1 | SBT187 | Lamellar | Lamellar |
| Rosuvastatin Placebo | SBT189 | Cubic Pn3m | Cubic Pn3m |

*SBT176 was tested when it was over 12 months old. Earlier testing of SBT122, and SBT123, which occurred only a couple months after formulation suggests that SBT176 may have formed form cubic phase if tested closer to its preparation.

A blend of the amphiphilic compound GMO and the active ingredient niacin was shown to form hexagonal phase in international patent publication no. WO 2014/179845.

Example 6—Clinical Efficacy

The first study evaluated bioequivalence of 5 mg Crestor and two 5 mg dose forms of the sublingual tablet with equivalent GMO to API (1:1) (SBT122) and 7×GMO to API (7:1) (SBT123). Each participant was given a single dose of medication on separate occasions after appropriate wash-out periods. After single dose of the prescribed preparation, blood samples were collected at time 0, 30 min, 60 min, 2 hours, 4 hours, 6 hours, 8 hours, 24 hours, 36 hours, 48 hours and 72 hours.

Subjects

Formulation of Example 1: 3 subjects participated in the study. 2 Caucasians (1 male and 1 female) and 1 Asian male.

Formulation of Example 2: 1 Caucasian male subject.

Tablets

The tablets were prepared according to the method in Example 3.

TABLE 5

| SBT122 | | |
| --- | --- | --- |
| Ingredient | % w/w | Function |
| Mannitol | 75.3 | Filler/Carrier |
| Rosuvastatin Calcium (micronized) | 7.3 | Drug substance/API |
| Povidone (Poly vinyl pyrrolidone) | 1.7 | Binder |
| Glyceryl Monooleate (GMO) | 7.3 | Bioadhesive/Mucoadhesive agent, Gelling agent, nonionic surfactant, sustained release agent |
| Sodium Starch Glycolate | 5.0 | Disintegration agent |
| Colloidal Silicon Dioxide | 2.0 | Glidant |
| Magnesium Stearate | 1.5 | Lubricant |
| Ethanol | N/A * | Solvent |

TABLE 6

| SBT123 | | |
| --- | --- | --- |
| Ingredient | % w/w | Function |
| Mannitol | 76.0 | Filler/Carrier |
| Rosuvastatin Calcium (micronized) | 1.6 | Drug substance/API |
| Povidone (Poly vinyl pyrrolidone) | 3.4 | Binder |
| Glyceryl Monooleate (GMO) | 10.5 | Bioadhesive/Mucoadhesive agent, Gelling agent, nonionic surfactant, sustained release agent |
| Sodium Starch Glycolate | 5.0 | Disintegration agent |
| Colloidal Silicon Dioxide | 2.0 | Glidant |
| Magnesium Stearate | 1.5 | Lubricant |
| Ethanol | N/A * | Solvent |

Method of Plasma Analysis

Plasma rosuvastatin analysis was undertaken at TetraQ-ADME Bioanalytics of the University of Queensland. The method used was based on Martin 2002 and Zhang 2011 to assess bioequivalence of oral rosuvastatin tablets. The method was validated for 1-200 ng/ml rosuvastatin. Plasma rosuvastatin below 1 ng/ml was below the limits of detection and not reported.

Application of the Method

The tablets were taken once per day for seven days.

Subjects fasted overnight and were administered a single tablet sublingually at 8.30-8.45 am. Water was consumed freely and a light snack consumed at 11.30 am.

Plasma was obtained by centrifugation (4,000×g for 10 min at room temperature) of whole blood collected in 4 ml lithium heparin tubes, decanted into 4 ml HDPE cryo-tubes then stored immediately at −180° C. Collected samples were transported within 7 days after freezing of the 72 hour sample collection, and courier overnight to TetraQ in Brisbane, Queensland Australia for analysis.

Results & Discussion

In accordance with literature, the Crestor tablet produced a fast uptake into plasma. The Asian subject produced higher plasma rosuvastatin than the other subjects in the study in accordance with the Crestor prescribing information.

The results are set out in Table 7.

TABLE 7

| Cholesterol results after 7 days of treatment | | |
| --- | --- | --- |
| | Total Cholesterol | LDL |
| Example 1 (after 7 days treatment, n = 3) | 25% reduction* | 37% reduction* |

TABLE 7-continued

| Cholesterol results after 7 days of treatment | | |
| --- | --- | --- |
| | Total Cholesterol | LDL |
| Example 2 (after 7 days treatment, n = 3) | 24% reduction* | 37% reduction* |
| Example 3 (after 7 days treatment, then after 14 days treatment, n = 1) | 30% reduction at 7 days 37% reduction at 14 days | 45% reduction at 7 days 58% reduction at 14 days |
| 6 weeks 5 mg oral Crestor | 24-33% reduction | 28-45% reduction |

*Mean result for the three subjects

Example 7—Prolonged Release

Figure 5:
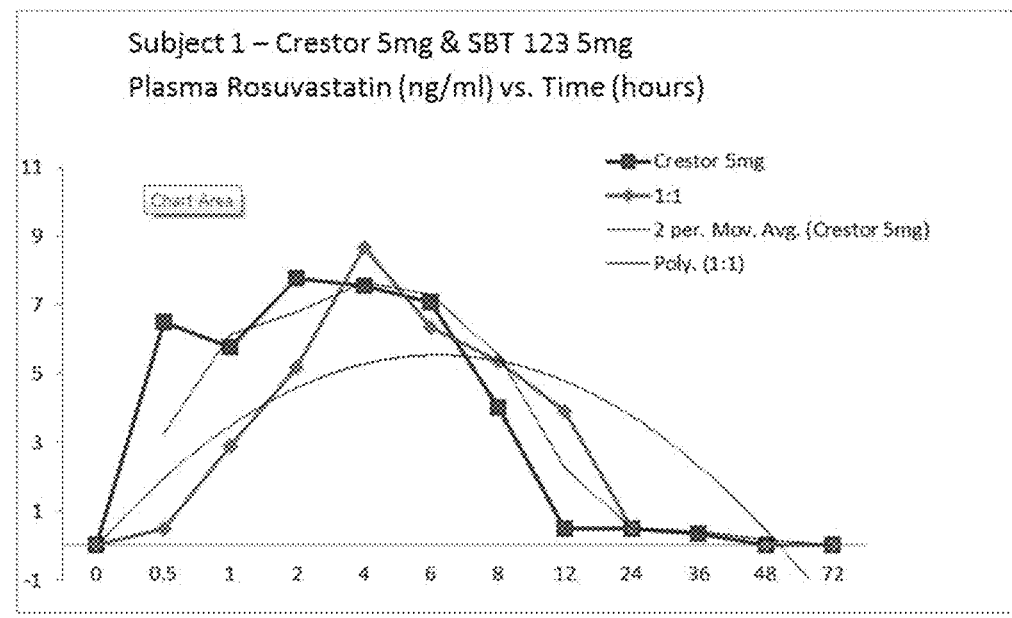
FIG. 5—Graph of the plasma rosuvastatin (ng/ml) v time for a first subject of the clinical study described in Example 6.
Figure 6:
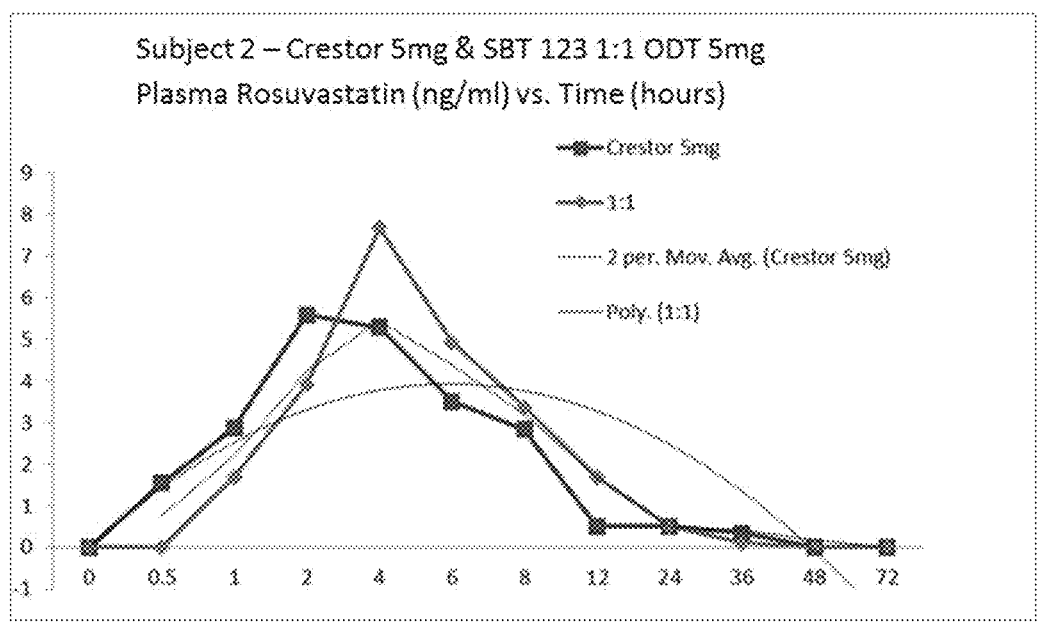
FIG. 6—Graph of the plasma rosuvastatin (ng/ml) v time for a second subject of the clinical study described in Example 6.
Figure 7:
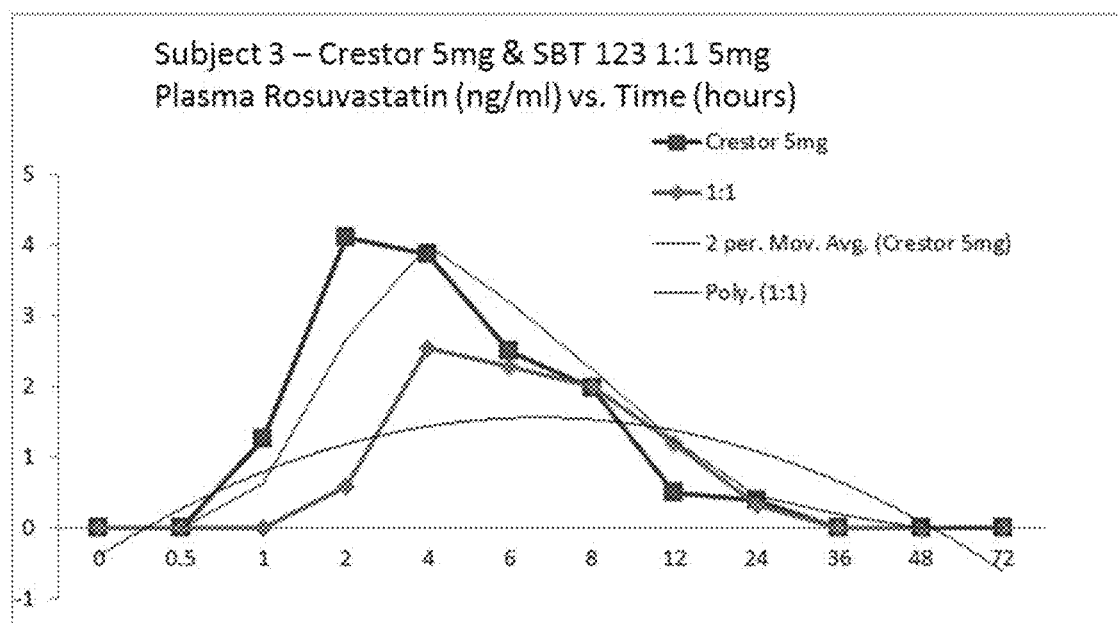
FIG. 7—Graph of the plasma rosuvastatin (ng/ml) v time for a third subject of the clinical study described in Example 6.

FIG. 5 shows the plasma rosuvastatin (ng/ml) v time for 1 subject of the clinical study described in Example 6 (Table 7, Example 1). The results compare plasma rosuvastatin over time when taking Oral 5 mg Crestor and the sublingual tablet with equivalent GMO to API (1:1). The moving average curves show a lower and longer curve for the ODT than for the oral tablet. A similar effect was observed for subject 2 (see FIG. 6) and subject 3 (see FIG. 7).

Figure 9:
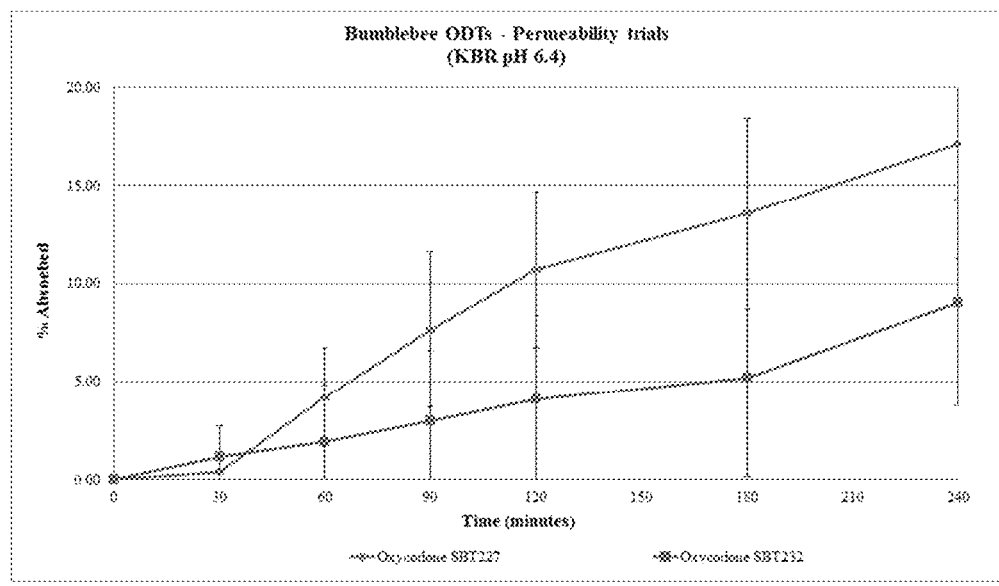
FIG. 9—The appearance of oxycodone in the receptor chamber over time after application of SBT227 (diamond) and SBT232 (square) to porcine buccal mucosa in the donor chamber of a Ussing chamber. Data are presented as mean±SEM (n=5). Both formulations demonstrate slow release characteristics. SBT227 release the API relatively faster comparing to SBT232 due to lower quantity of GMO.

FIG. 9 shows that in vitro release of oxycodone through a porcine mucosal membrane shows a prolonged release profile with release continuing steadily at 4 hours. Maximum blood concentration is achieved about 1 hour after administration of an OxyNorm tablet.

Figure 11A:
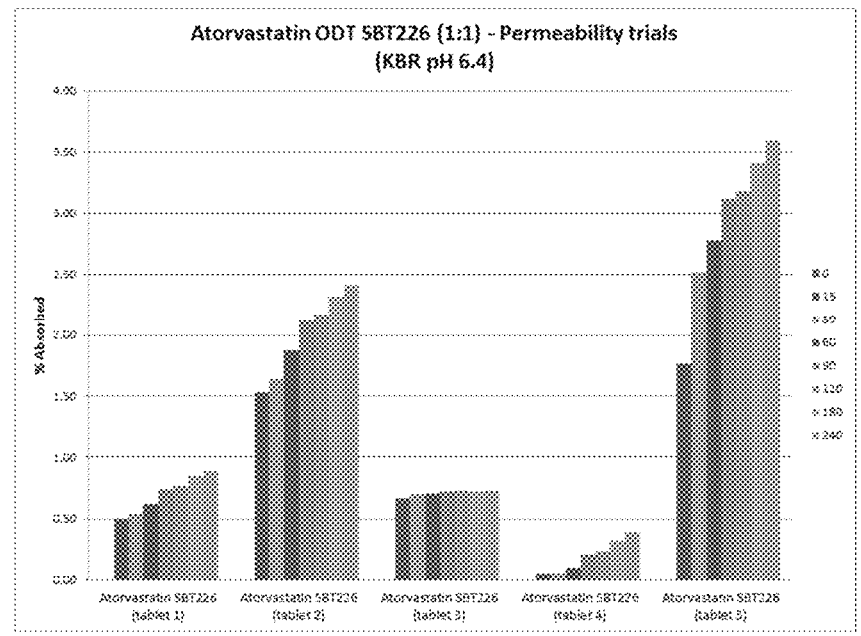
FIGS. 11A & 11B—The results for each individual tablet that were combined to prepare the mean results depicted in FIG. 10 are shown in FIG. 11A—SBT226 tablet testing and FIG. 11B—SBT233 testing. Release of atorvastatin into the receptor chamber at 0, 0.25, 0.5, 1, 1.5, 2, 3 and 4 hours is shown. The individual testing results demonstrate slow release continuing at 4 hours for 4 out of the 5 SBT226 tablets and 3 out of the 5 SBT233 tablets.
Figure 11B:
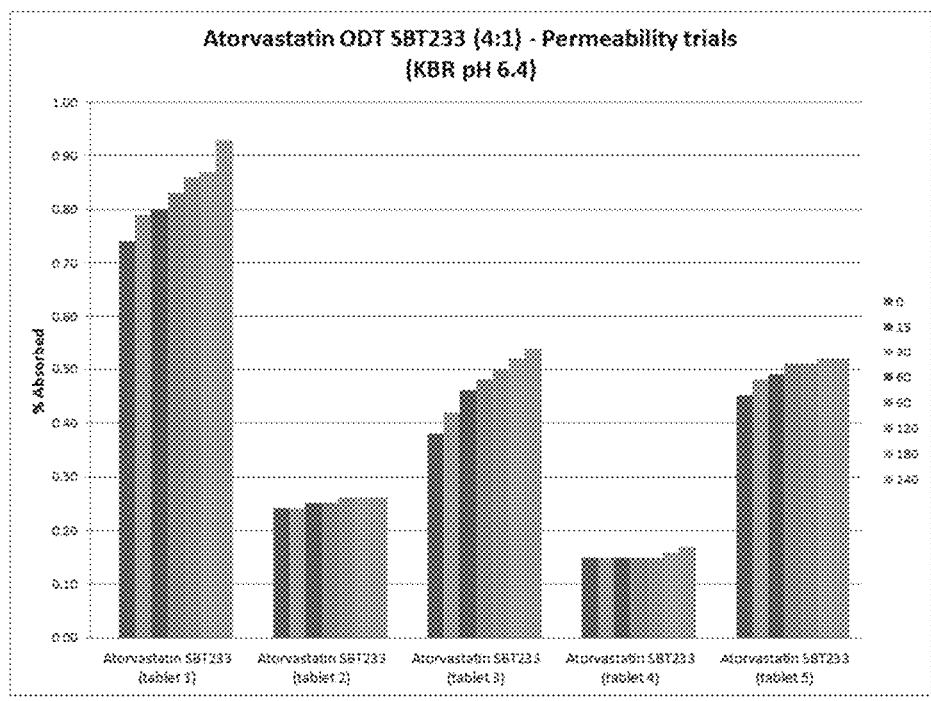

Similarly, FIGS. 11A and 11B show that in vitro release of atorvastatin through a porcine mucosal membrane was slow release and continuing at 4 hours for 4 of the 5 SBT226 and 3 of the 5 SBT233 tablets tested. Without being bound by theory, Ussing chamber testing is less robust than some in vitro testing methods and it is possible that there was a technical difficulty in the testing of the tablets that did not show slow release. Lipitor oral tablets achieve maximum plasma concentration within 1-2 hours following administration.

A blend of the amphiphilic compound GMO and the active ingredient niacin was shown to exhibit prolonged release in international patent publication no. WO 2014/179845.

Example 8—In Vitro Release Testing

Release of an active ingredient from and ODT through a mucosal membrane can be tested in vitro.

Porcine buccal mucosa was freshly isolated from pigs cheeks, mounted between modified Ussing chambers with a donor chamber, receptor chamber and the porcine buccal mucosa in between with a diffusional area of 0.64 $cm^2$, and incubated in Krebs bicarbonate Ringer buffer (KBR, pH 7.4) for 30 min. The mixture or tablet containing rosuvastatin (supplied by Aspen Pharmacare Australia) were applied to the porcine buccal mucosa (ie in the donor chamber) and, when necessary, Parafilm was applied to cover the formulation (ie for tablets and for mixtures containing glyceryl monooleate (GMO) and rosuvastatin). The Parafilm prevented the various formulations from detaching from the buccal mucosa. KBR buffer (1.5 mL) was then added to both the donor and receptor chambers, and receptor samples (200 µL) were collected from the receptor chamber at various time points up to 4-5 hours to determine the amount of rosuvastatin that passed through the porcine buccal mucosa to the receptor chamber. 200 µL of fresh KBR was dispensed into the receptor chamber after each collection (to ensure volume balance). Receptor chamber samples were provided to Aspen Pharmacare Australia for quantification of rosuvastatin by HPLC.

Positive control was tested by making rosuvastatin solutions of 0.4 and 0.8 mg/1.5 ml KBR solution, equivalent to 1:1 and 7:1 ODT's. Total rosuvastatin absorbed per minute in the 1:1 was 0.6 ng/ml and 7:1 was 0.3 ng/ml. Adding more rosuvastatin to the donor chamber didn't improve permeation.

When a mixture was tested, GMO and rosuvastatin were manually mixed on the day of the experiment. The amount of rosuvastatin in the receptor chamber is in FIG. 1. The highest average peak area is in Table 8 below.

TABLE 8 effect of ratio of GMO to API

| Formulation | Highest average peak area result (HPLC) |
| --- | --- |
| GMO:API 1:1 mixture | 22 |
| GMO:API 5:1 mixture | 27 |
| GMO:API 7:1 mixture | 43 |

These results show that including more MO than API improves the quantity of permeation of the API through the buccal mucosa.

Figure 2:
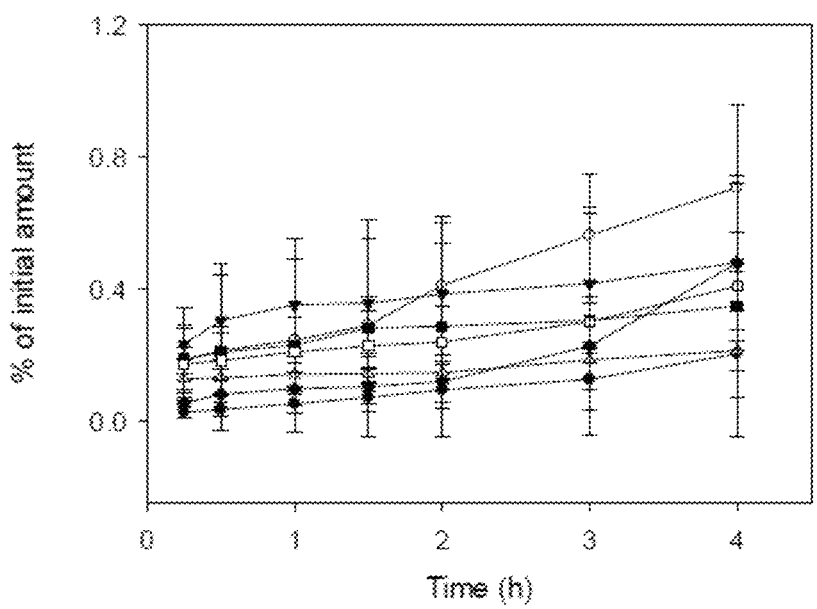
FIG. 2—The appearance of rosuvastatin in the receptor chamber after application of SBT tablets 122 (closed circle), 123 (open circle), 137 (closed triangle), 138 (open triangle) to porcine buccal mucosa in the donor chamber of a modified Franz Cell. Data are presented as mean±SEM (n=3-5). The closed square, open square and closed diamond and not relevant.
Figure 3:
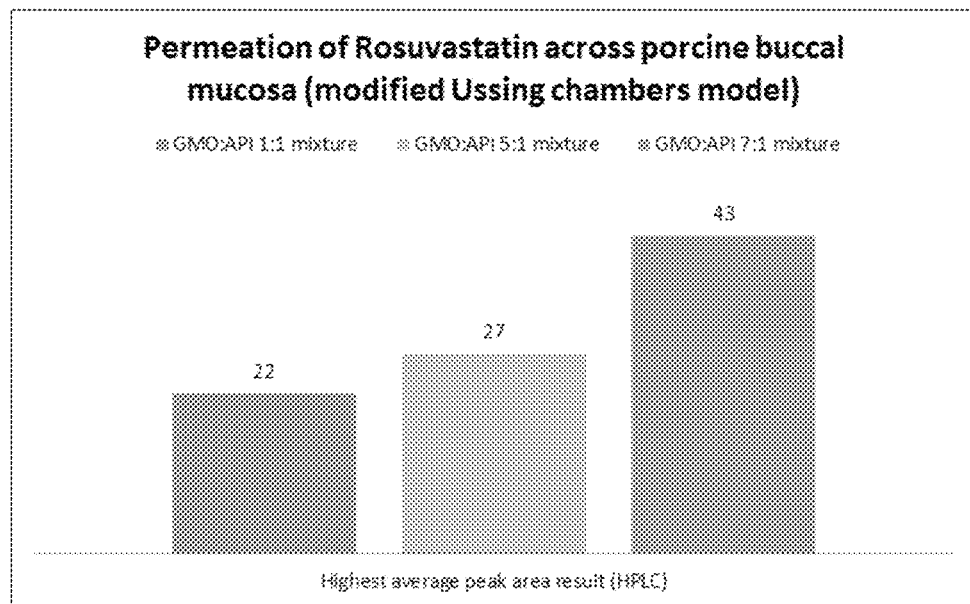
FIG. 3—Graph of the highest average peak area from the HPLC on samples from the receptor chamber in the experiment graphed in FIG. 1.
Figure 4:
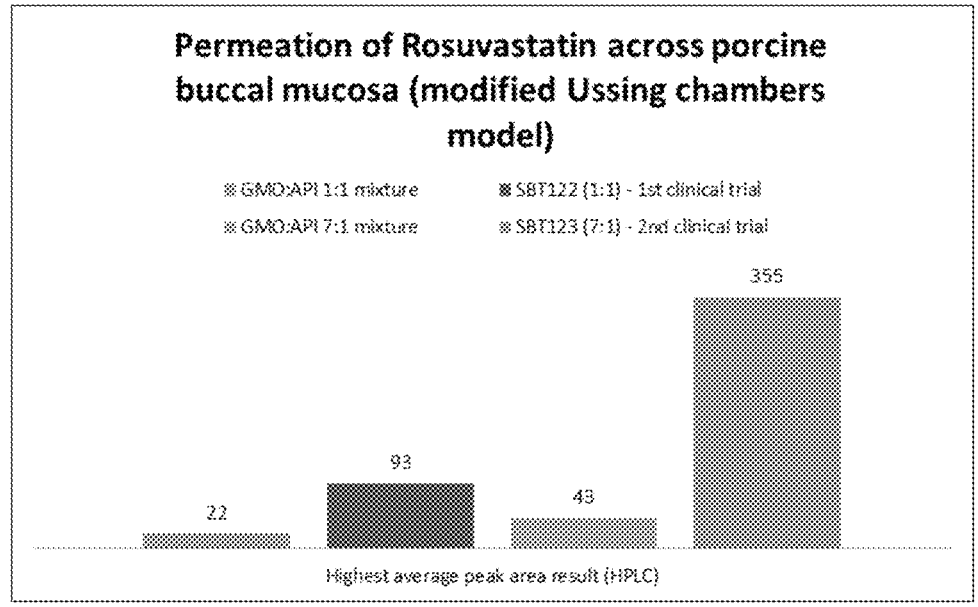
FIG. 4—Graph of the highest average peak area from the HPLC on samples from the receptor chamber in the experiment graphed in FIG. 2.

When the tablets were tested, the tablet of Table 1 was applied to the porcine buccal mucosa whole but the tablet of Table 2 was halved before application to the mucosa to better enable the parafilm to hold the tablet in place. The amount of rosuvastatin in the receptor chamber during testing of the tablets is in FIG. 2. The highest average peak area is in Table 9 below.

TABLE 9 effect of tablet formulation

| Formulation | Highest average peak area result (HPLC) |
| --- | --- |
| GMO:API 1:1 mixture | 22 |
| GMO:API 7:1 mixture | 43 |
| Formulation of Example 6 (1:1 ratio) (SBT122) | 93 |
| Formulation of Example 6 (7:1 ratio) (SBT123) | 355 |

These results show that permeation through the buccal mucosa is better with a tablet than with a simple mixture. Also, an increased ratio of GMO to API still improves permeation in the tablet form. The results are shown in FIGS. 1 to 4.

When tested in the permeability cell, SL tablets were well hydrated and disintegrated within the experimental timeframe. 0.17% or 1.34 ng/ml/min of rosuvastatin in the 1:1 SL tablet used in the clinical trial achieving 125-132% (GS & VO) of the oral Crestor tablet, passed into the receiving chamber. Interestingly 1.41% or 6.1 ng/ml/min more of the 7:1 rosuvastatin passed into the receiving chamber.

The permeation of the active ingredient from the ODT of the invention was also tested for ODTs containing oxycodone and ODTs containing atorvastatin to establish that the ODT functioned to deliver active ingredients having varied Log P values and varied dosages. This time samples were taken from the receiving chamber of the Ussing chamber repeatedly at 0.5, 1, 1.5, 2, 3 and 4 hours to establish not only that the active ingredient permeated the mucosa but that release of the active ingredient was prolonged.

The appearance of oxycodone in the receptor chamber over time is depicted in FIG. 9 after application of ODT SBT227 (diamond) and ODT SBT232 (square) to porcine buccal mucosa in the donor chamber of the Ussing chamber. Data are presented as mean±SEM (n=5). Both formulations demonstrate slow release characteristics. SBT227, with a 1:1 ratio of active ingredient to GMO, released the API relatively faster compared to SBT232, with a 1:4 ratio of active ingredient to GMO. Without being bound by theory, this is thought to be due to the lower quantity of GMO in the SBT227 formulation.

Figure 10:
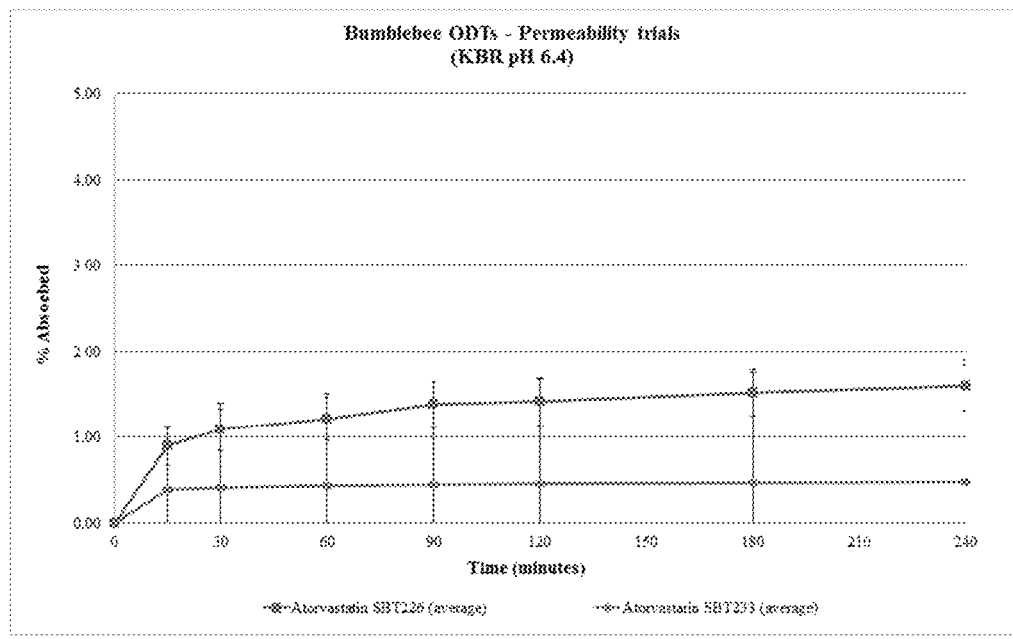
FIG. 10—The appearance of atorvastatin in the receptor chamber over time after application of SBT226 (square) and SBT233 (diamond) to porcine buccal mucosa in the donor chamber of a Ussing chamber. Data are presented as mean±SEM (n=5). Both formulations demonstrate slow release characteristics. SBT226 release the API relatively faster comparing to SBT233 due to lower quantity of GMO.

The appearance of atorvastatin in the receptor chamber over time is depicted in FIG. 10 after application of ODT SBT226 (square) and SBT233 (diamond) to porcine buccal mucosa in the donor chamber of the Ussing chamber. Data are presented as mean±SEM (n=5). Both formulations demonstrate slow release characteristics. SBT226, with a 1:1 ratio of active ingredient to GMO, released the API relatively faster comparing to SBT233, with a 1:4 ratio of active ingredient to GMO. Without being bound by theory, this is thought to be due to the lower quantity of GMO in the SBT226 formulation.

Adrenaline degrades very quickly upon exposure to air or light. The in vitro release of adrenaline has not yet been tested as a suitable method accounting for the instability of adrenaline needs to be developed. However, in view of the results to date, adrenaline is expected to pass through the porcine oral mucosa in a Ussing chamber.

Example 9—Clinical Testing of Fast Disintegrating ODT Containing Rosuvastatin in Patients with Statin Intolerance A randomised double-blind crossover study was conducted on statin-intolerant subjects.

Methods: 21 subjects (13 males, 18 females, mean age 70, 37-90 yrs) with stable CAD and documented statin-intolerance were recruited. After a 2-week washout period, subjects took blinded sublingual rosuvastatin 5 mg (SBT 176) or placebo for 6 weeks, followed by a 2-week washout period then another 6 weeks of either SL statin/placebo. Blood tests prior to the study, weeks 1, 3 and 6 were obtained and repeated over the next 6-week block. Myalgia scores, creatine kinase (CK) levels, liver function tests (LFT) and TC, LDL and HDL lipid levels were obtained. Myalgia was scored from 0 to 10 using the Visual Analog Scale for Pain, with 0 being "no pain" and 10 being "extreme pain". Statistical analysis was performed on study completion.

Figure 8A:
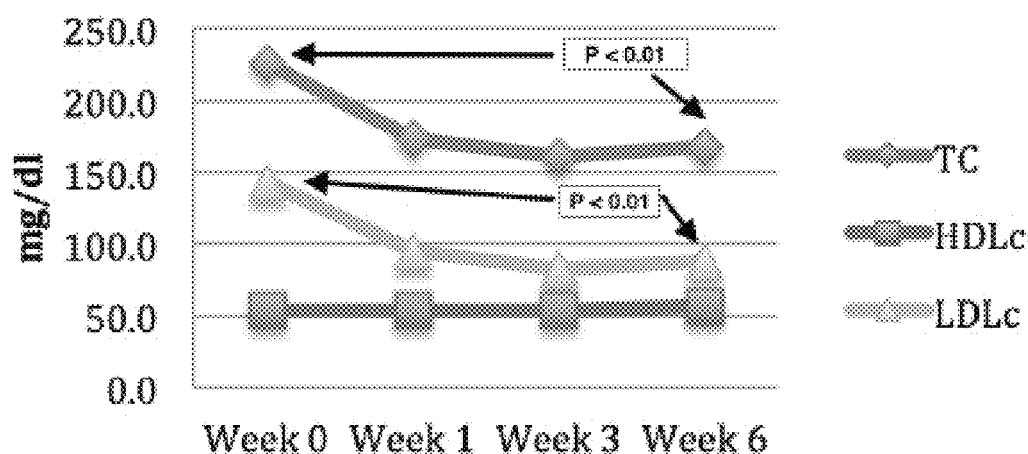
FIGS. 8A & 8B—Graph of the changes in total cholesterol (TC), LDLc and HDLc following clinical testing of fast disintegrating ODT containing rosuvastatin in patients with statin intolerance are in FIG. 8A. The placebo results are in FIG. 8B.
Figure 8B:
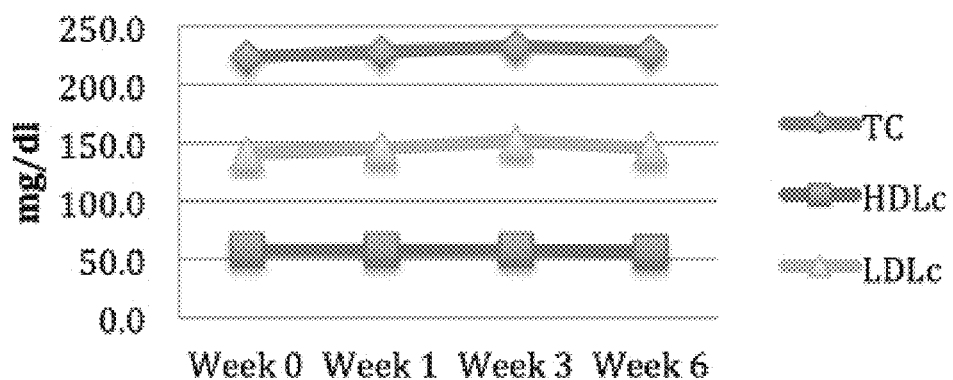

Results: Compared to placebo, there were significant 29% reduction in total cholesterol (p<0.01), 42% reduction in LDLc (p<0.01) and non-significant 6% increase in HDLc (p=0.11), no change in myalgia score (p=0.85). No significant CK change (p=0.83). No change in lipid levels were noted during placebo treatment. Two patients dropped out due to "myalgia", but they were in the placebo group when they dropped out. A graph of the changes in total cholesterol (TC), LDLc and HDLc is in FIG. 8A and the placebo results in FIG. 8B.

Conclusion: We have successfully demonstrated that a novel sublingual formulation of rosuvastatin may solve the problem of statin-induced myalgia while at the same time effecting significant reduction in cholesterol levels.

Example 10—Transferring Patients from High Dose Traditional Statin Medication

A patient taking 80 mg atorvastatin (Lipitor) was selected. The 80 mg atorvastatin dose was ceased and 4 days later the patient commenced SL rosuvastatin (SBT 176). The patient took sublingual rosuvastatin 5 mg for six weeks followed by a two week wash out then placebo for 6 weeks. Blood tests were taken prior to the study, at weeks 1, 3 and 6 and at the end of the placebo period. Myalgia scores, creatine kinase (CK) levels and TC, LDL and HDL lipid levels were obtained. The results are in Table 10 below.

TABLE 10

Results following transition from high dose atorvastatin

|  | Pre-study | Week 1 | Week 3 | Week 6 | Placebo |
|---|---|---|---|---|---|
| TC (mmol/l) | 4.7* | 4.7 | 4.4 | 4.5 | 6.6 |
| HDL (mmol/l) | 1.1 | 1.4 | 1.5 | 1.5 | 1.5 |
| LDL (mmol/l) | 2.6 | 1.8 | 1.7 | 2.1 | 3.4 |
| CK | 198 | 165 | 126 | 155 | 96 |
| Myalgia Score | 2 | 0 | 0 | 0 | 0 |

When a patient on the highest indicated dose of atorvastatin ceases taking that medication, the patient's total cholesterol (TC) and LDL levels are expected to increase. Similarly, when a patient on the highest indicated dose of atorvastatin ceases taking that medication and commences taking a lower dose of that medication, the patient's total cholesterol (TC) and LDL levels are expected to increase. When the patient taking 80 mg atorvastatin ceased taking that medication and instead took only 5 mg SL rosuvastatin, the patients TC and LDL were expected to increase. Instead, both results were maintained at reasonable levels and an increase in TC and LDL was avoided. Both TC and LDL did rise when the patient subsequently took placebo. The patient's myalgia score lowered as did their CK levels following commencement of the SL treatment.

The invention claimed is:

1. An oral disintegrating tablet for sublingual or buccal administration of an active ingredient suitable for systemic administration of an active ingredient via the oral mucosa comprising:
   an amphiphilic compound that self-assembles into liquid crystalline particles when the oral disintegrating tablet is contacted by a hydrophilic solvent;
   a therapeutically effective amount of the active ingredient; and
   a pharmaceutically acceptable disintegrant;
   wherein the w/w ratio of amphiphilic compound to active ingredient is about 1:1 to 100:1;
   wherein upon administration to a human subject, the tablet disintegrates in less than 2 minutes;
   wherein the amphiphilic compound thereby self-assembles in situ into functional liquid crystalline particles that are not damaged by the disintegration and that prolong the release of the active ingredient via the oral mucosa,
   wherein the tablet prolongs the release of the active ingredient, and
   wherein the liquid crystalline particles form lamella phase, cubic phase or hexagonal phase.

2. The tablet according to claim 1, wherein the tablet is capable of adhering to the oral mucosa.

3. The tablet according to claim 1, wherein the release of the active ingredient is prolonged compared to release of the same active ingredient from an immediate release oral tablet.

4. The tablet according to claim 1, wherein the oral disintegrating tablet disintegrates in 1 to 60 seconds.

5. The tablet according to claim 1, wherein the amphiphilic compound has one or more of the groups selected from the group consisting of a critical packing parameter (CPP) of >½ and a hydrophilic lipophilic balance (HLB) of 0 to <10.

6. The tablet according to claim 1, wherein the amphiphilic compound has the structure of Formula (I):

$$X\text{-}T \qquad \text{Formula (I)}$$

wherein

X is selected from the group consisting of an ester, ether, anhydride, amide, amine, carbamide, glycerol, biuret, phenyl, pyridine, and phosphate having at least 2 hydrogen bond forming functional groups; and T is selected form the group consisting of:
   (i) a single $C_{12}$ to $C_{18}$ alkyl, alkenyl and alkynyl terminally attached to X optionally comprising:
      a. one or more double bonds; or
      b. three or more methyl branches; and
   (ii) two $C_{12}$ to $C_{18}$ alkyl, alkenyl and alkynyl both terminally attached to X.

7. The tablet according to claim 1, wherein the active ingredient has a log P of –0.5 to 6.4 and/or a molecular weight of 100 to 1200.

8. The tablet according to claim 1, wherein the oral disintegrating tablet retains about 90% or more of the active ingredient following storage at 25° C./60% RH for at least 6 months.

9. The tablet according to claim 1, wherein the disintegrant is about 10 to about 50% w/w of the tablet.

10. The tablet according to claim 1, wherein the disintegrant is sodium starch glycolate, crosslinked polyvinylpyrrolidone or both.

11. The tablet according to claim 1, wherein the amphiphilic compound is a glycerol monoleate.

12. The tablet according to claim 1, wherein the amphiphilic compound is 1 to 20% w/w of the tablet.

13. The tablet according to claim 1, wherein the active ingredient is 0.4 to 9% w/w of the tablet.

14. A method of administering an active ingredient via the oral mucosa comprising administration of the tablet according to claim 1.

15. The method of claim 14, wherein the maximum blood concentration of the active ingredient occurs over 30 minutes following administration of the tablet.

16. The tablet according to claim 1, wherein the oral disintegrating tablet disintegrates in 1 to 10 seconds.

17. The tablet according to claim 1, wherein the oral disintegrating tablet is mucoadhesive.

18. The tablet according to claim 1, wherein the liquid crystalline particles are mucoadhesive.

19. An oral disintegrating tablet comprising:
   an amphiphilic compound that self-assembles into liquid crystalline particles when the oral disintegrating tablet is contacted by a hydrophilic solvent;
   a therapeutically effective amount of an active ingredient; and
   a pharmaceutically acceptable disintegrant;
   wherein the tablet disintegrates in 1 to 60 seconds;
   wherein the w/w ratio of the amphiphilic compound to active ingredient is about 1:1 to about 100:1;
   wherein upon disintegration, the amphiphilic compound self-assembles in situ into functional liquid crystalline particles that are not damaged by the disintegration and that prolong the release of the active ingredient,
   wherein the tablet prolongs the release of the active ingredient, and
   wherein the liquid crystalline particles form lamella phase, cubic phase or hexagonal phase.

20. The tablet according to claim 6, wherein T is a single $C_{12}$ to $C_{18}$ alkenyl terminally attached to X comprising one or more double bonds, wherein at least one double bond is cis and located at about $C_7$ to $C_{11}$.

21. The tablet according to claim 6, wherein T is a single $C_{12}$ to $C_{18}$ alkyl terminally attached to X comprising three or more methyl branches, wherein the branching is isoprenoid branching.

* * * * *